(12) United States Patent
Iiyama et al.

(10) Patent No.: US 11,539,437 B2
(45) Date of Patent: Dec. 27, 2022

(54) SIGNAL PROCESSING APPARATUS AND OPTICAL RECEIVING APPARATUS

(71) Applicant: NIPPON TELEGRAPH AND TELEPHONE CORPORATION, Tokyo (JP)

(72) Inventors: Noriko Iiyama, Musashino (JP); Masamichi Fujiwara, Musashino (JP); Junichi Kani, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 109 days.

(21) Appl. No.: 17/252,435

(22) PCT Filed: Jun. 5, 2019

(86) PCT No.: PCT/JP2019/022316
§ 371 (c)(1),
(2) Date: Dec. 15, 2020

(87) PCT Pub. No.: WO2019/244634
PCT Pub. Date: Dec. 26, 2019

(65) Prior Publication Data
US 2021/0258075 A1 Aug. 19, 2021

(30) Foreign Application Priority Data
Jun. 18, 2018 (JP) .............................. JP2018-115558

(51) Int. Cl.
*H04B 10/60* (2013.01)
*H04B 10/2507* (2013.01)
(Continued)

(52) U.S. Cl.
CPC ....... *H04B 10/25073* (2013.01); *H04B 10/60* (2013.01); *H04B 10/272* (2013.01); *H04B 10/6971* (2013.01)

(58) Field of Classification Search
CPC .............. H04B 10/25073; H04B 10/60; H04B 10/272; H04B 10/6971; H04B 3/06
(Continued)

(56) References Cited

U.S. PATENT DOCUMENTS 9,048,957 B2 * 6/2015 Nakashima .......... H04B 10/613
9,094,117 B1 * 7/2015 Wang ................... H04B 10/614
(Continued)

FOREIGN PATENT DOCUMENTS

JP 2017152773 A 8/2017

*Primary Examiner* — Dibson J Sanchez

(57) ABSTRACT

A signal processing device included in an optical reception device configured to receive a burst optical signal transmitted by one of a plurality of optical transmission devices, includes a symbol timing detecting unit configured to detect a symbol timing based on sample signals obtained by oversampling the burst optical signal converted into an electric signal with a sampling rate higher than a symbol rate, an adaptive equalization filter unit configured to perform an equalization process on the sample signals, and a timing matching unit configured to match timing such that, when the adaptive equalization filter unit takes in the sample signals, one of the taken-in sample signals corresponding to the symbol timing is given to a tap of which a tap coefficient has a maximum value among taps included in the adaptive equalization filter unit.

14 Claims, 30 Drawing Sheets

(51) Int. Cl.
*H04B 10/69* (2013.01)
*H04B 10/272* (2013.01)

(58) Field of Classification Search
USPC .................................................. 398/202–214
See application file for complete search history.

(56) References Cited

U.S. PATENT DOCUMENTS

| | | | | |
|---|---|---|---|---|
| 9,419,726 | B2* | 8/2016 | Fludger | H04B 10/614 |
| 2008/0198051 | A1* | 8/2008 | Tanimura | H03M 1/1255 |
| | | | | 341/137 |
| 2010/0329697 | A1* | 12/2010 | Koizumi | H04L 27/2276 |
| | | | | 398/208 |
| 2011/0229127 | A1* | 9/2011 | Sakamoto | H04B 10/6165 |
| | | | | 398/25 |
| 2012/0134684 | A1* | 5/2012 | Koizumi | H04L 25/03044 |
| | | | | 375/232 |
| 2012/0308227 | A1* | 12/2012 | Komaki | H04B 10/25073 |
| | | | | 398/25 |
| 2013/0287390 | A1* | 10/2013 | Abe | H03H 17/0202 |
| | | | | 398/208 |
| 2014/0212132 | A1* | 7/2014 | Saito | H04L 25/03 |
| | | | | 398/152 |
| 2015/0180586 | A1* | 6/2015 | Oota | H04B 10/616 |
| | | | | 398/27 |
| 2015/0365262 | A1* | 12/2015 | Iwamura | H04B 10/6971 |
| | | | | 375/230 |
| 2019/0181952 | A1* | 6/2019 | Jia | H04L 12/2885 |
| 2019/0280779 | A1* | 9/2019 | Imoto | H04B 10/6161 |
| 2020/0052793 | A1* | 2/2020 | Hamaoka | H04B 10/6165 |

* cited by examiner

| TAP POSITION | 1 | 2 | ... | i | ... | k |
|---|---|---|---|---|---|---|
| INITIAL VALUE | $W_{D1}$ | $W_{D2}$ | ... | $W_{Di}$ | ... | $W_{Dk}$ |

PEAK INITIAL VALUE

| TAP POSITION | 1 | 2 | ... | j | ... | k |
|---|---|---|---|---|---|---|
| CONVERGED COEFFICIENT | $W_{C1}$ | $W_{C2}$ | ... | $W_{Cj}$ | ... | $W_{Ck}$ |

PEAK OF CONVERGED TAP COEFFICIENT

Fig. 20

| TRANSMISSION SOURCE | POSITION OF PEAK TAP COEFFICIENT | TAP COEFFICIENT 1 | TAP COEFFICIENT 2 | ... | TAP COEFFICIENT K |
|---|---|---|---|---|---|
| (INFORMATION REPRESENTING TRANSMISSION SOURCE) | (POSITION INFORMATION OF PEAK TAP COEFFICIENT) | (TAP COEFFICIENT VALUE) | (TAP COEFFICIENT VALUE) | ... | (TAP COEFFICIENT VALUE) |
| ... | ... | ... | ... | ... | ... |

SIGNAL PROCESSING APPARATUS AND OPTICAL RECEIVING APPARATUS

CROSS-REFERENCE TO RELATED APPLICATIONS

This application is a 371 U.S. National Phase of International Application No. PCT/JP2019/022316, filed on Jun. 5, 2019, which claims priority to Japanese Application No. 2018-115558 filed on Jun. 18, 2018. The entire disclosures of the above applications are incorporated herein by reference.

TECHNICAL FIELD

The present invention relates to a signal processing device and an optical reception device.

BACKGROUND ART

The system currently employed in Japan as an optical subscriber system access network includes a passive optical network (PON) system. For example, as illustrated in FIG. 28, a communication system 500 employing the PON system includes one station-side communication apparatus 510, a plurality of subscriber-side communication apparatuses 550-1 to 550-N, and an optical coupler 560. The station-side communication apparatus 510 and the optical coupler 560 are connected using an optical fiber 565, and the plurality of subscriber-side communication apparatuses 550-1 to 550-N and the optical coupler 560 are connected using optical fibers 566-1 to 566-N, respectively (here, N is an integer that is equal to or greater than 2).

Thus, in the PON system, the optical fibers 565 and 566-1 to 566-N can be laid more economically than in a system in which the station-side communication apparatus 510 and the subscriber-side communication apparatuses 550-1 to 550-N are connected using optical fibers to form one-to-one connection.

In one-to-many communication as in the PON system, there are an uplink signal transmitted from the plurality of subscriber-side communication apparatuses 550-1 to 550-N to the station-side communication apparatus 510 and a downlink signal transmitted from the station-side communication apparatus 510 to the plurality of subscriber-side communication apparatuses 550-1 to 550-N. Therefore, in the PON system, a multiplexing technology for transmitting/receiving signals without causing the signals to collide with each other or be lost in the section of the optical fiber 565 is required.

In communication systems of the current PON system that are practically used, a time division multiplexing (TDM) technology in which a station-side communication apparatus 510 performs transmission and reception with individual times allocated to subscriber-side communication apparatuses 550-1 to 550-N is employed as a multiplexing technology. In addition, for an uplink signal, as a technology for L2 (Layer2) control in which the station-side communication apparatus 510 allocates communication times to the subscriber-side communication apparatuses 550-1 to 550-N, a dynamic bandwidth allocation (DBA) technology is employed.

As illustrated in FIG. 29, in transmission of an uplink signal of a TDM-PON system using the DBA, each of the subscriber-side communication apparatuses 550-1 to 550-N transmits the uplink signal at a communication time at which the transmission of a signal is permitted as a frame configuration. This uplink signal is referred to as an uplink burst signal (hereinafter referred to as a "burst optical signal") in the TDM-PON system. The following are two characteristics of the burst optical signal.

First, in the TDM-PON system using the DBA, signals are transmitted in accordance with communication times that are allocated to the subscriber-side communication apparatuses 550-1 to 550-N. For this reason, a signal received by the station-side communication apparatus 510 is not a continuous signal but an intermittent signal, in other words, a signal in which there is a no-signal time between signals.

Second, in the TDM-PON system using the DBA, there are individual differences in the frequency characteristics of the subscriber-side communication apparatuses 550-1 to 550-N, and transmission line conditions between the subscriber-side communication apparatuses 550-1 to 550-N and the station-side communication apparatus 510, for example, distances and the like, are different. For this reason, signals received by the station-side communication apparatus 510 are signals of which characteristics such as intensities, distortions, and the like are different for the subscriber-side communication apparatuses 550-1 to 550-N that have transmitted the signals.

The burst optical signal transmitted in the frame configuration described above is also referred to as a burst frame. As illustrated in FIG. 30, a burst frame 600 generally includes three parts including a preamble 601, a payload 602, and an end of burst 603. The payload 602 is an actual signal section, and the preamble 601 used for signal synchronization, equalization of received signal levels, and the like is added prior to the payload 602. The end of burst 603 after the payload 602 is a time that includes a fall of a laser and the like.

In recent years, implementation of small cells for responding to rapidly-increasing mobile traffic advances in a mobile communication network has been anticipated, and the use of a PON technology has been reviewed as an economical housing unit of the small cells.

It is known that conditions such as a transmission distance, a transmission speed, and the like of a housing unit in a mobile communication network are stricter than those of an optical subscriber system. For this reason, it is assumed that there is a limit in a direct detection (DD) system (hereinafter referred to as an "analog DD system") configured only of analog components that is employed as a wave detection technology in the current PON system.

Thus, technologies relating to applying a detection system using digital signal processing to a communication system of the PON system instead of applying an analog DD system have been reviewed. By using the digital signal processing, coping with various modulation systems that are difficult to realize using the analog DD system can be performed, and distortion of signals according to transmission can be compensated for.

The most common detection system using the digital signal processing is a digital coherent detection system combined with a coherent detection system. Optical reception devices using the digital coherent detection system have already been commercialized for core/metropolitan networks, and elemental technologies have been established.

In a detection system or a reception system that uses digital signal processing including the digital coherent detection system, a process to be performed using the digital signal processing differs in accordance with a target system or a compensation target, and a plurality of processes are generally combined.

For example, in a case that a high-order modulation system is employed, a demodulation process of high-order modulation is performed using digital signal processing. In addition, in a case that a high-order modulation system is combined with a coherent detection system, particularly an intra-dyne detection system, a process of compensating for distortion of a signal according to a frequency difference between signal light and local light, in other words, distortion represented in the form of rotation of a signal point on an IQ plane through digital signal processing, is performed.

A process of equalizing waveform distortion for improving minimum light reception sensitivity is also one process that is generally performed in an optical reception device including a signal processing unit that performs digital signal processing, and the equalization process can be performed in any of a time domain and a frequency domain. FIG. 31 is a block diagram illustrating a general example of an adaptive equalization filter 700 in a time domain that is configured in a signal processing unit performing digital signal processing. A filter input signal that is input to the adaptive equalization filter 700 is, for example, a digital signal as illustrated in FIG. 32(b).

The digital signal illustrated in FIG. 32(b) is a signal obtained by oversampling an analog signal illustrated in FIG. 32(a) using an analog/digital converter (ADC) at a sampling rate that is m times (here, m is an integer equal to or larger than 2) a symbol rate. The oversampling may be performed by combining interpolation processing with the ADC. A time T of one symbol interval is T=1/symbol rate in the analog signal illustrated in FIG. 32(a), and m=3 in the digital signal illustrated in FIG. 32(b).

In the adaptive equalization filter 700 illustrated in FIG. 31, "k" is a value indicating the number of taps, and "k" is an integer equal to or larger than 2. k adjacent sample signals of the digital signal become filter input signals, and the k sample signals are respectively multiplied by tap coefficients $W_1$ to $W_k$ by multipliers 720-1 to 720-$k$. The plurality of products acquired through the multiplication are summed by the adder 750 to become filter output values, and a filter output signal is acquired by aligning the filter output values in a time series.

A tap coefficient calculating unit 770 illustrated in FIG. 31 calculates updated values of the tap coefficients $W_1$ to $W_k$ based on filter output values and reference values such as target values of the filter output values. Any initial values can be configured initially as the tap coefficients $W_1$ to $W_k$, and thus, when the adaptive equalization filter 700 starts to calculate the tap coefficients $W_1$ to $W_k$, the filter output value is a value different from a desired value. The filter output value is caused to approach the desired value by repeating feedback calculation using the tap coefficient calculating unit 770.

A calculation time required to approach the desired value depends on an algorithm and parameters used for calculating the tap coefficients $W_1$ to $W_k$, and feedback calculation may be necessary any number of times. The filter output value reaching a desired value according to a predetermined criterion will be referred to as convergence of tap coefficients, and a time required until the convergence will be referred to as a convergence time.

Whether the optical reception device including the adaptive equalization filter 700 satisfies desired light reception sensitivity is basically evaluated in accordance with a bit error rate (BER) after the convergence of the tap coefficients $W_1$ to $W_k$. A filter output signal before the convergence of the tap coefficients $W_1$ to $W_k$ may be a signal not satisfying a desired signal quality or may be in a state in which the signal cannot be restored. For this reason, in the optical reception device that compensates a signal using the adaptive equalization filter 700, the tap coefficients $W_1$ to $W_k$ are generally caused to converge using a signal that is not an actual signal such as the preamble 601 before the actual signal is processed. The adaptive equalization filter 700 compensates a signal of an actual signal part included in the payload 602 using the tap coefficients $W_1$ to $W_k$ that have converged.

In addition, the tap coefficients $W_1$ to $W_k$ are specific to the distortion of a signal which is to be compensated, and when the frequency characteristics of a transmission source of the filter input signal or the state of a transmission line changes even after the tap coefficients $W_1$ to $W_k$ converge, the filter output value deviates from the desired value. In such a case, it is necessary to cause the tap coefficients to converge again through repetition of feedback calculation, and a longer time is required for the convergence.

There is a unit that causes the tap coefficients $W_1$ to $W_k$ to converge by transmitting a signal used for causing the tap coefficients $W_1$ to $W_k$ to converge before an actual sign for a continuous signal in one-to-one communication such as a core/metro system network when compensation of a signal is performed using the adaptive equalization filter 700. In this way, by processing the actual signal thereafter, compensation of the actual signal can be performed using the tap coefficients $W_1$ to $W_k$ that have converged.

In contrast to this, in a case that a burst optical signal in the TDM-PON system of an optical access network is received by the station-side communication apparatus 510, a subscriber-side communication apparatus among the subscriber-side communication apparatuses 550-1 to 550-N that is a transmission source of the burst frame 600 differs for each burst frame 600. When the subscriber-side communication apparatuses 550-1 to 550-N are different, the frequency characteristics of an optical transmission device included in each of the subscriber-side communication apparatuses 550-1 to 550-N and a transmission line through which the signal passes are also different. For this reason, the distortion of the signal is different for each burst frame 600, and optimal tap coefficients have different values.

When a new burst frame 600 arrives at the station-side communication apparatus 510, the tap coefficients $W_1$ to $W_k$ of the adaptive equalization filter 700 have initial values or values that are optimal for the previous burst frame 600 but do not have values that are optimal for the burst frame 600 that has arrived. For this reason, a convergence time for causing the tap coefficients $W_1$ to $W_k$ to converge is necessary each time a new burst frame 600 arrives.

In addition, it is necessary to perform adaptive equalization filtering of a payload 602 of a burst frame 600 using the tap coefficients $W_1$ to $W_k$ that have converged, and thus a preamble 601 needs to be set to be longer than a predicted convergence time. When the convergence time is longer, the length of the preamble 601 increases, and thus a time allocated to the payload 602 is shortened and the transmission efficiency is reduced. For this reason, it is desirable to shorten the convergence time also from the viewpoint of transmission efficiency.

CITATION LIST

Patent Literature

PTL1: JP 2017-152773A

SUMMARY OF THE INVENTION

Technical Problem

In the TDM-PON system described above, in order to solve the problem in which the optimal tap coefficients are different for each burst frame 600, for example, the following technology has been disclosed in PTL1. In the technology disclosed in PTL1, optimal tap coefficients are calculated for each burst frame 600 and are associated with the subscriber-side communication apparatuses 550-1 to 550-N that are transmission sources in advance. When a DBA is processed and DBA scheduling information is obtained, a transmission source of a burst frame 600 that will arrive next is specified from the scheduling information. Then, by detecting optimal tap coefficients corresponding to the specified transmission source and replacing the tap coefficients with the detected tap coefficients for each burst frame 600, a convergence time of the tap coefficients is shortened.

However, the technology described in PTL1 employs a configuration in which optimal tap coefficients are calculated for each transmission source in advance and the calculated optimal tap coefficients are selected and applied in accordance with the scheduling information, and thus an operation time required for the calculation of the tap coefficients is not necessarily shortened. For this reason, in a case that the characteristics of a transmission line change or a subscriber-side communication apparatus that is a transmission source is newly added, there is a problem in that it is necessary to calculate optimal tap coefficients by repeating feedback calculation based on a burst optical signal transmitted by the transmission source as in the related art.

In view of the situation described above, an object of the present invention is to provide a technology enabling shortening of a convergence time in the calculation of optimal tap coefficients.

Means for Solving the Problem

An aspect of the present invention is a signal processing device included in an optical reception device configured to receive a burst optical signal transmitted by one of a plurality of optical transmission devices, the signal processing device including a symbol timing detecting unit configured to detect a symbol timing based on sample signals obtained by oversampling the burst optical signal converted into an electric signal with a sampling rate higher than a symbol rate, an adaptive equalization filter unit configured to perform an equalization process on the sample signals, and a timing matching unit configured to match timing such that, when the adaptive equalization filter unit takes in the sample signals, one of the taken-in sample signals corresponding to the symbol timing is given to a tap of which a tap coefficient has a maximum value among taps included in the adaptive equalization filter unit.

Another aspect of the present invention is the signal processing device described above, in which the timing matching unit includes an input timing adjusting unit configured to take in the sample signals and give the one of the taken-in sample signals corresponding to the symbol timing to the tap of which the tap coefficient has the maximum value by adjusting a timing at which the taken-in sample signals are output to the adaptive equalization filter unit.

Another aspect of the present invention is the above-described signal processing device in which the input timing adjusting unit includes a delay amount calculating unit configured to calculate an amount of delay based on the symbol timing detected by the symbol timing detecting unit and a position of the tap of which the tap coefficient has the maximum value and a delay unit configured to take in the sample signals and output the taken-in sample signals to the adaptive equalization filter unit with delay in accordance with the amount of delay calculated by the delay amount calculating unit.

Another aspect of the present invention is the signal processing device described above in which the input timing adjusting unit is configured to adjust a timing at which the taken-in sample signals is output to the adaptive equalization filter unit such that, in a case that the adaptive equalization filter unit obtains the tap coefficients that have converged, the one of the taken-in sample signals corresponding to the symbol timing is given to the tap to which a maximum value of the converged tap coefficients is given.

Another aspect of the present invention is the above-described signal processing device, further including a frame detecting unit configured to detect, as a burst frame signal, a part corresponding to a frame of the burst optical signal from the sample signals, and a tap coefficient initializing unit configured to set, in a case that the frame detecting unit newly detects the burst frame signal, the tap coefficients of the taps in the adaptive equalization filter unit to initial values set in advance.

Another aspect of the present invention is the signal processing device described above, further including a tap coefficient selecting unit configured to select the tap coefficient corresponding to the one of the plurality of optical transmission devices that transmits the burst optical signal next among the tap coefficients set in advance for the plurality of optical transmission devices based on scheduling information representing a timing at which each of the plurality of optical transmission devices transmits the burst optical signal and give the selected tap coefficient to the taps included in the adaptive equalization filter unit, wherein the input timing adjusting unit takes in the sample signals and adjusts a timing at which the taken-in sample signals is output to the adaptive equalization filter unit, and thus outputs the one of the taken-in sample signals corresponding to the symbol timing to the tap of which the tap coefficient has a maximum value among the tap coefficients given by the tap coefficient selecting unit to the taps.

Another aspect of the present invention is the signal processing device described above, in which the timing matching unit includes a tap coefficient initial value adjusting unit configured to give the tap coefficient to the taps included in the adaptive equalization filter unit such that the tap coefficient of the tap to which the one of the taken-in sample signals corresponding to the symbol timing is given reaches a maximum value.

Another aspect of the present invention is an optical reception device including a light reception unit configured to receive a burst optical signal transmitted by one of a plurality of optical transmission devices, convert the burst optical signal into an analog electric signal, and output the analog electric signal, an analog-to-digital conversion unit configured to convert the analog electric signal output by the light reception unit corresponding to the burst optical signal into a digital signal including sample signals obtained by oversampling with a sampling rate higher than a symbol rate, and a signal processing unit that is the signal processing device described above.

Effects of the Invention

According to the present invention, a convergence time in the calculation of optimal tap coefficients can be shortened.

BRIEF DESCRIPTION OF DRAWINGS

FIG. 20 is a diagram illustrating a data configuration of a tap coefficient table stored in a storage unit of the optical reception device according to the third embodiment.

DESCRIPTION OF EMBODIMENTS

First Embodiment

Figure 1:
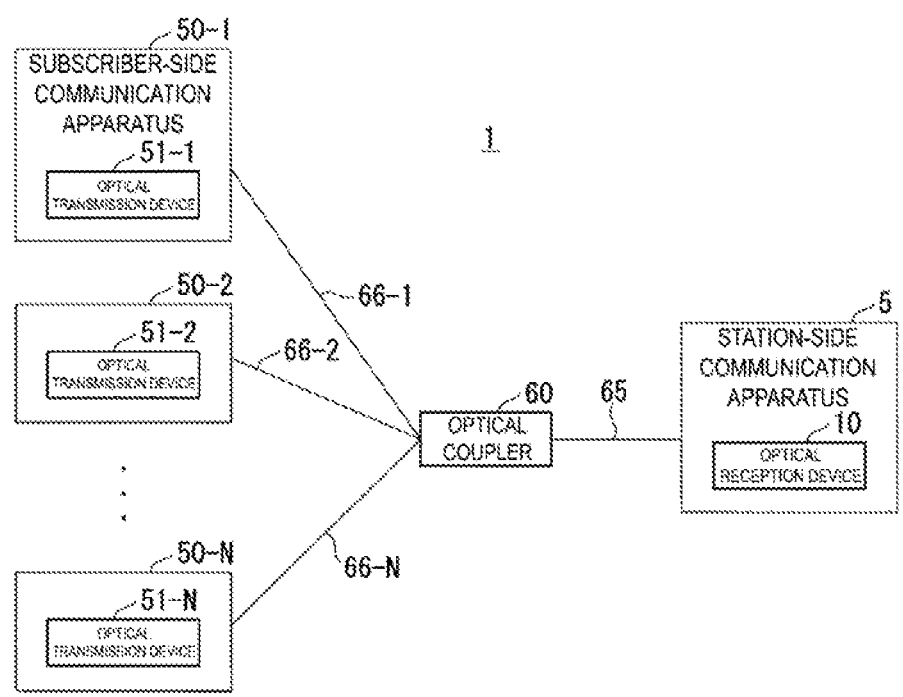
FIG. 1 is a block diagram illustrating the configuration of a communication system according to a first embodiment.

Embodiments of the present invention will be described below with reference to the drawings. FIG. 1 is a block diagram illustrating the configuration of a communication system 1 according to a first embodiment. The communication system 1 is, for example, a communication system of a TDM-PON system and includes a station-side communication apparatus 5, subscriber-side communication apparatuses 50-1 to 50-N (here, N is an integer that is equal to or larger than two), and an optical coupler 60.

The station-side communication apparatus 5 and the optical coupler 60 are connected using an optical fiber 65, and the plurality of subscriber-side communication apparatuses 50-1 to 50-N and the optical coupler 60 are connected using optical fibers 66-1 to 66-N, respectively.

The station-side communication apparatus 5 and the subscriber-side communication apparatuses 50-1 to 50-N each include an optical transmission device that transmits optical signals and an optical reception device that receives optical signals. FIG. 1 illustrates an optical reception device 10 of the station-side communication apparatus 5 of which a configuration will be described in the following first embodiment and optical transmission devices 51-1 to 51-N of the subscriber-side communication apparatuses 50-1 to 50-N that transmit optical signals to the optical reception device 10.

A TDM technology is applied to the communication system 1, allowing the station-side communication apparatus 5 to perform transmission/reception with individual times allocated to the subscriber-side communication apparatuses 50-1 to 50-N. In addition, a DBA technology is applied to an uplink signal, allowing the optical reception device 10 of the station-side communication apparatus 5 dynamically to allocate communication times to optical transmission devices 51-1 to 51-N of the subscriber-side communication apparatuses 50-1 to 50-N.

Figure 2:
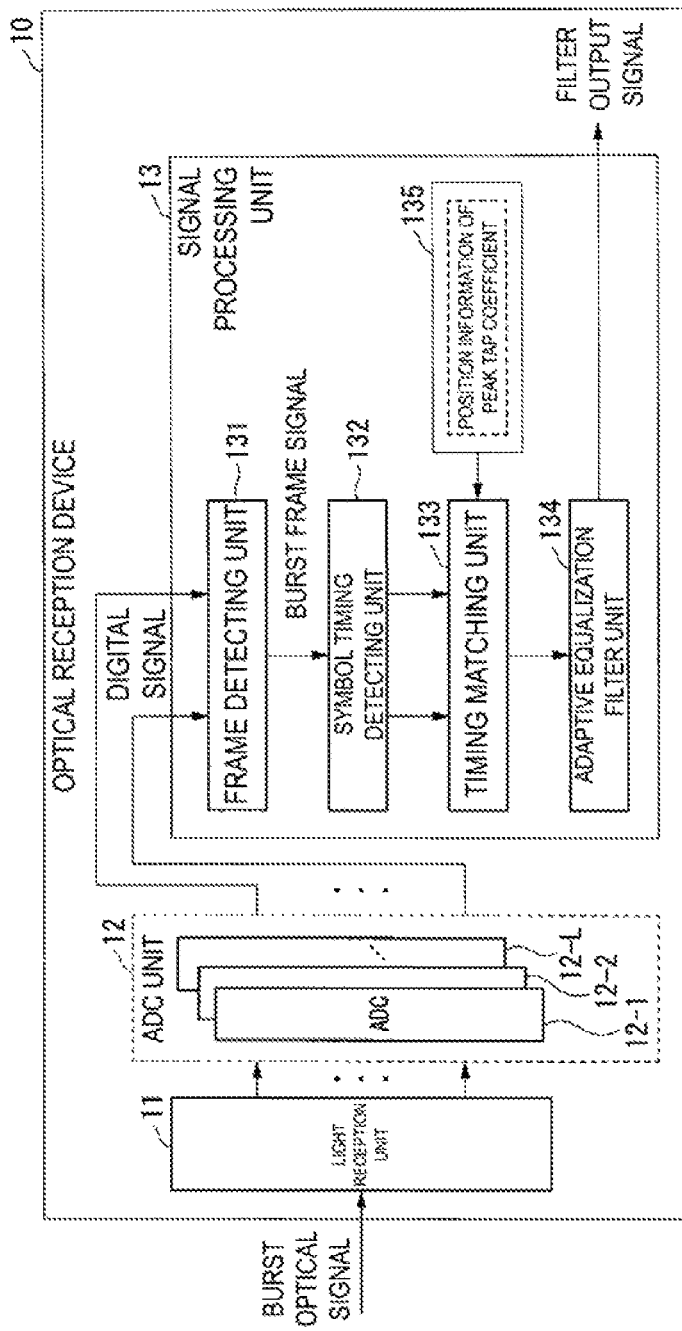
FIG. 2 is a block diagram illustrating the configuration of an optical reception device of a station-side communication apparatus according to the first embodiment.

FIG. 2 is a block diagram illustrating the internal configuration of the optical reception device 10 of the station-side communication apparatus 5. The optical reception device 10 includes a light reception unit 11, an ADC unit 12, and a signal processing unit 13. The light reception unit 11 receives burst optical signals transmitted by the optical transmission devices 51-1 to 51-N of the subscriber-side communication apparatuses 50-1 to 50-N, converts the received burst optical signals into electric signals, and outputs the converted electric signals. Either a DD detector or a coherent detector may be applied as the light reception unit 11.

The ADC unit 12 includes at least one ADC 12-1. In a case that a coherent detector is applied as the light reception unit 11, or a system of polarization diversity, polarization multiplexing, or the like is applied, the number of outputs of the light reception unit 11 increases, and thus the ADC unit 12, as illustrated in FIG. 2, includes a plurality of ADCs 12-1 to 12-L corresponding to the number of outputs of the light reception unit 11 (in a case that a plurality of ADCs are included, L is an integer that is equal to or greater than two).

Figure 32:
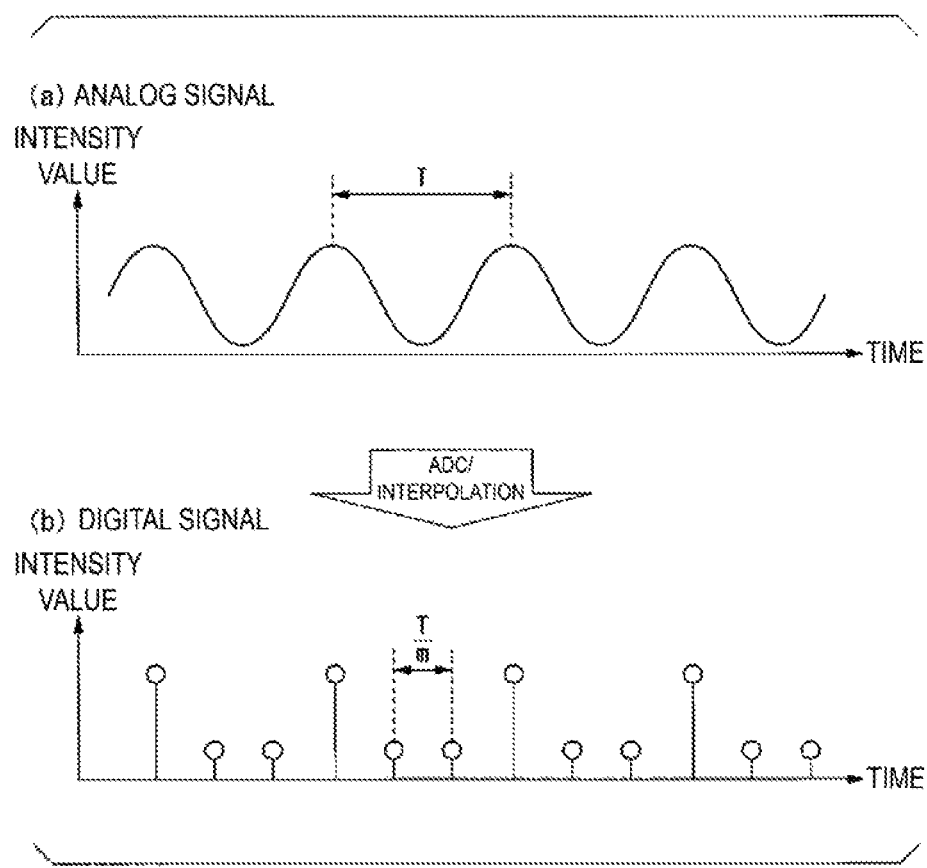
FIG. 32 is a diagram illustrating an example of an analog signal and a digital signal of electricity obtained from a burst optical signal.

Each of the ADCs 12-1 to 12-L takes in an analog electric signal output by the light reception unit 11, converts the analog electric signal into a digital electric signal (hereinafter referred to as a "digital signal") by oversampling the analog electric signal at a sampling rate that is m times a symbol rate of a burst optical signal, and outputs the digital signal (here, m is an integer that is equal to or greater than two). The analog electric signal output by the light reception unit 11 is, for example, a signal having a waveform illustrated in FIG. 32($a$), and the digital signal output by the ADC unit 12 is, for example, a signal including a plurality of sample signals acquired through oversampling illustrated in FIG. 32($b$) in the case of m=3. As described above, T is a time of one symbol interval, and T=1/symbol rate.

The signal processing unit 13 is a functional unit that performs digital signal processing and includes a frame detecting unit 131, a symbol timing detecting unit 132, a timing matching unit 133, an adaptive equalization filter unit 134, and a storage unit 135.

Figure 30:
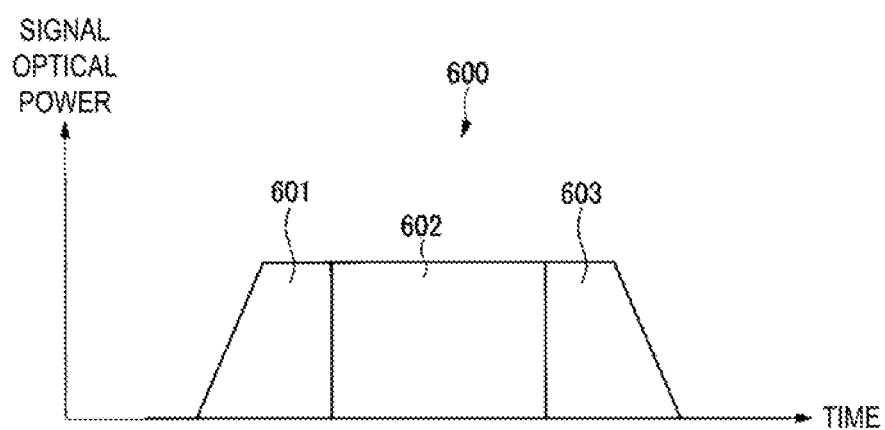
FIG. 30 is a diagram illustrating a frame configuration of a burst signal.
Figure 31:
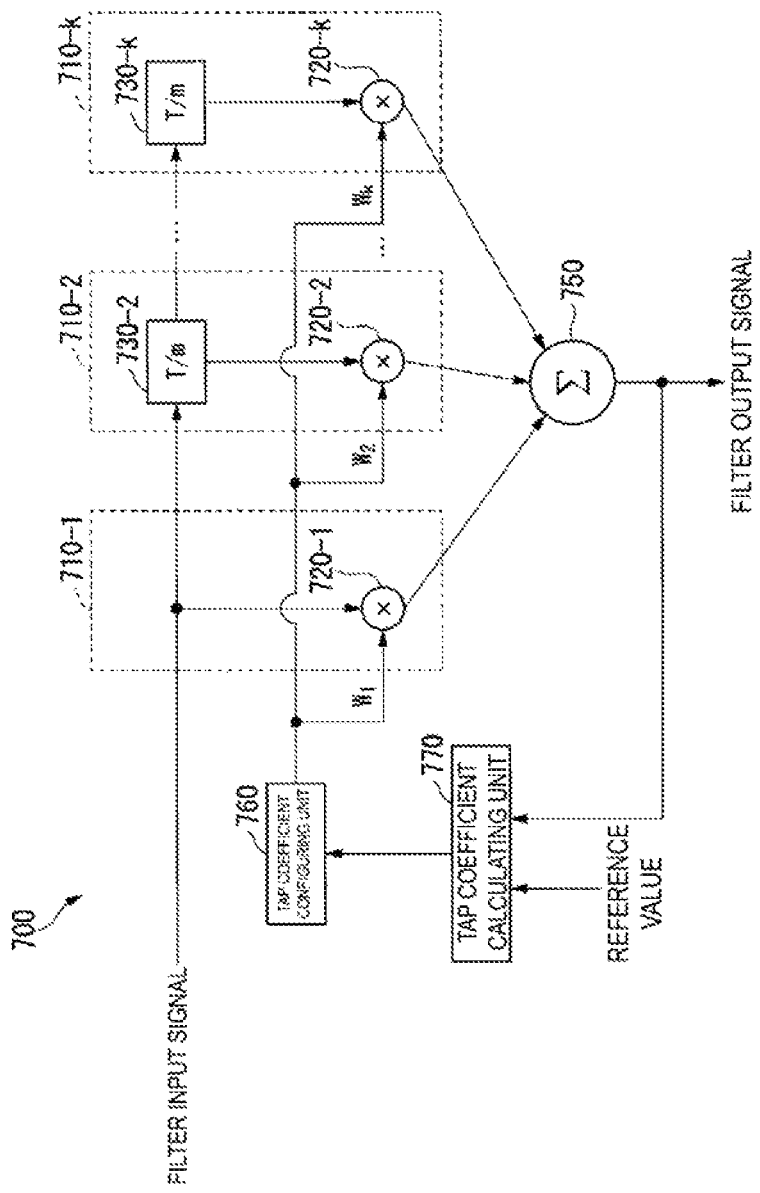
FIG. 31 is a block diagram illustrating the configuration of a general adaptive equalization filter.

The frame detecting unit 131 takes in a digital signal output by the ADC unit 12 and detects a burst frame. The frame detecting unit 131 detects that a new burst frame has arrived from the optical transmission devices 51-1 to 51-N in a no-signal state by detecting a burst frame. The burst frame detected by the frame detecting unit 131 is, for example, a burst frame acquired by converting the burst frame 600 illustrated in FIG. 30 described above into a digital signal that is an electric signal. Hereinafter, a burst frame converted into a digital signal that is an electric signal will be referred to as a burst frame signal.

The frame detecting unit 131 outputs the detected burst frame signal to the symbol timing detecting unit 132. The number of inputs of the frame detecting unit 131 increases in accordance with the number of the ADCs 12-1 to 12-L.

The symbol timing detecting unit 132 takes in a burst frame signal output by the frame detecting unit 131 and detects a symbol timing of the over-sampled burst frame signal. In addition, the symbol timing detecting unit 132 generates and outputs a symbol timing notification signal including information representing the detected symbol timing. Here, the symbol timing detected by the symbol timing detecting unit 132 is a position of a sample signal that is the closest to the original symbol timing, and will hereinafter be referred to as a sample signal corresponding to the symbol timing. The information representing a symbol timing is information representing a position of a sample signal corresponding to the symbol timing. The symbol timing detecting unit 132 outputs the taken-in burst frame signal as a main signal.

The storage unit 135 stores information of a position of a maximum value in a series of tap coefficients $W_1$ to $W_k$ (hereinafter referred to as position information of a peak tap coefficient), in other words, a position of a tap to which one of tap coefficients $W_1$ to $W_k$ that has a maximum value among the taps 40-1 to 40-$k$ of the adaptive equalization filter unit 134 is given in advance.

Figure 3:
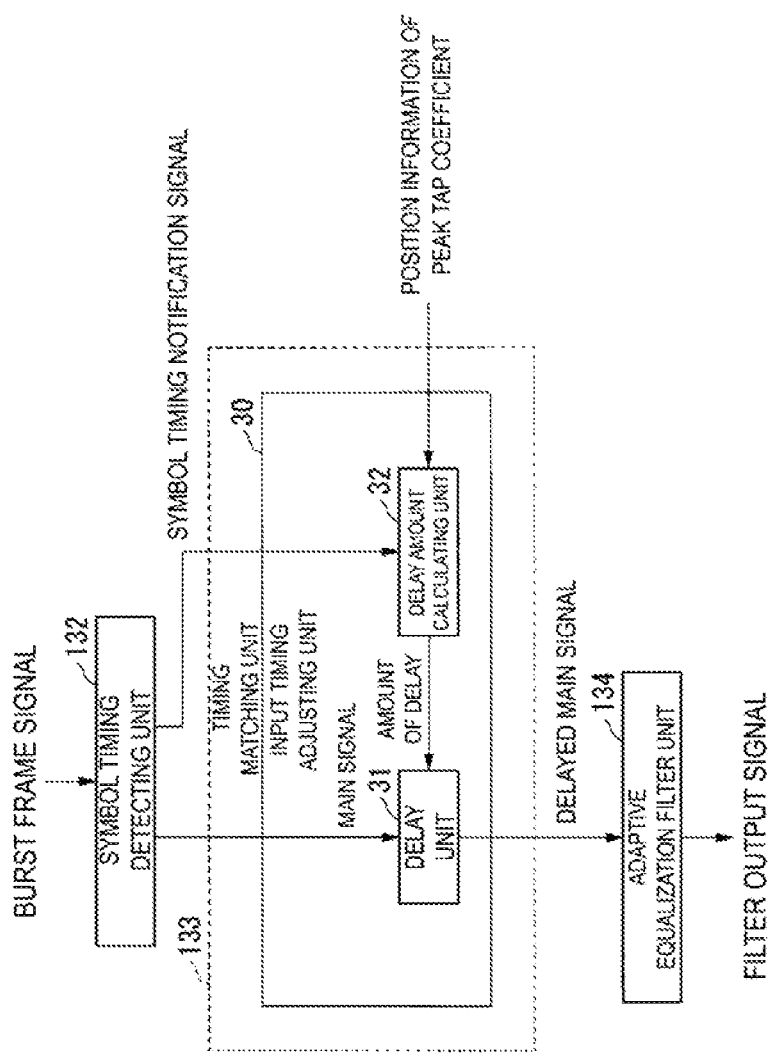
FIG. 3 is a diagram illustrating an internal configuration of a timing matching unit according to the first embodiment and a connection relation thereof with other functional units.

The timing matching unit 133 includes an input timing adjusting unit 30 illustrated in FIG. 3. The input timing adjusting unit 30 includes a delay unit 31 and a delay amount calculating unit 32. The delay amount calculating unit 32 takes in a symbol timing notification signal output by the symbol timing detecting unit 132. In addition, the delay amount calculating unit 32 calculates an amount of delay based on the information representing a symbol timing included in the symbol timing notification signal that has been taken in and position information of the peak tap coefficient stored in the storage unit 135.

The delay unit 31 takes in a main signal output by the symbol timing detecting unit 132, delays the main signal that has been taken in by a time according to the amount of delay calculated by the delay amount calculating unit 32 for each main signal, and outputs the main signal to the adaptive equalization filter unit 134.

Figure 4:
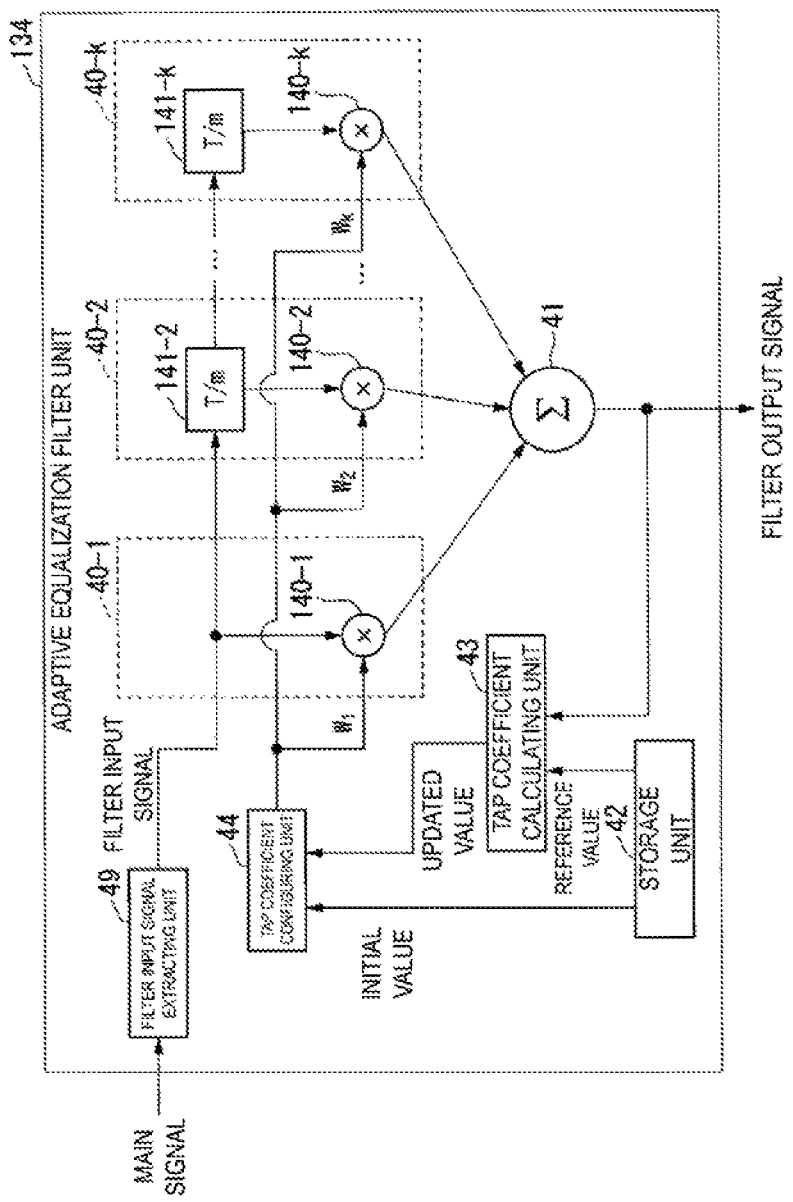
FIG. 4 is a diagram illustrating an internal configuration of an adaptive equalization filter unit according to the first embodiment.

The adaptive equalization filter unit 134 has an internal configuration illustrated in FIG. 4 and includes a plurality of taps 40-1 to 40-$k$, an adder 41, a storage unit 42, a tap coefficient calculating unit 43, a tap coefficient configuring unit 44, and a filter input signal extracting unit 49 (here k is an integer that is equal to or greater than 2).

The filter input signal extracting unit 49 takes in the main signal output by the delay unit 31 and sequentially outputs k sample signals acquired by delaying the taken-in main signal by m samples, in other words, by one symbol each time, as filter input signals.

For example, in a case that k sample signals $X_1$ to $X_{1+k}$ extracted from a main signal are output as filter input signals at a first period, the filter input signal extracting unit 49 outputs k sample signals $X_{1+m}$ to $X_{1+m+k}$ extracted from the main signal as filter input signals at a second period and outputs k sample signals $X_{1+2m}$ to $X_{1+2m+k}$ extracted from the main signal as filter input signals at a third period. In this way, the filter output signal output by the adaptive equalization filter unit 134 can match the symbol rate through down-sampling.

The plurality of taps 40-1 to 40-$k$ respectively include multipliers 140-1 to 140-$k$. In addition, the taps 40-2 to 40-$k$ of a second stage and subsequent stages among the plurality of taps 40-1 to 40-$k$ respectively include delay units 141-2 to 141-$k$. Each of the delay units 141-2 to 141-$k$ outputs a sample signal of a time "T/m" before, which is one unit time of the sample signal. For example, assuming that filter input signals are aligned in order of $X_1, X_2, \ldots, X_{1+k}$ sequentially from a signal of an earlier time, $X_{1+k}, X_k, \ldots, X_1$ are given in order of the multipliers 140-1, 140-2, . . . , 140-$k$.

The multipliers 140-1 to 140-$k$ respectively multiply the tap coefficients $W_1$ to $W_k$ given from the tap coefficient configuring unit 44 by sample signals of the filter input signals and output the products to the adder 41. The adder 41 adds the products output by the multipliers 140-1 to 140-$k$ and outputs a total value as a filter output value. By aligning the filter output values in a time series, a filter output signal is obtained. The storage unit 42 stores in advance initial values of the tap coefficients $W_1$ to $W_k$ which are set in advance and a reference value such as target value of the filter output value which is set in advance.

The tap coefficient calculating unit 43 calculates updated values of the tap coefficients $W_1$ to $W_k$ based on the filter output value output by the adder 41 and the reference value stored in the storage unit 42. Hereinafter, for convenience of description, the updated values of the tap coefficients $W_1$ to $W_k$ calculated by the tap coefficient calculating unit 43 are represented as tap coefficients $W_{M1}$ to $W_{Mk}$ by adding "M" to the subscripts.

As an algorithm for the tap coefficient calculating unit 43 to calculate tap coefficients $W_{M1}$ to $W_{Mk}$ that are updated values, for example, a technique based on a least squares method, a technique based on a recursive least squares method, or the like is applied. There are various algorithms, and thus a technique that is optimal to a target system may be applied.

When the optical reception device 10 is activated, the tap coefficient configuring unit 44 reads the tap coefficients $W_1$ to $W_k$ that are initial values stored in the storage unit 42 and outputs the tap coefficients $W_1$ to $W_k$ that are the read initial values to the multipliers 140-1 to 140-$k$. In addition, the tap coefficient configuring unit 44 takes in the tap coefficients $W_{M1}$ to $W_{Mk}$ that are the updated values calculated by the tap coefficient calculating unit 43 and outputs the updated tap coefficients $W_{M1}$ to $W_{Mk}$ to the multipliers 140-1 to 140-$k$.

(Purpose of Matching Using Timing Matching Unit)

Hereinafter, the purpose of the timing matching unit 133 matching a symbol timing and peak tap coefficients $W_1$ to $W_k$ will be described.

Figures 5, 6, 7:
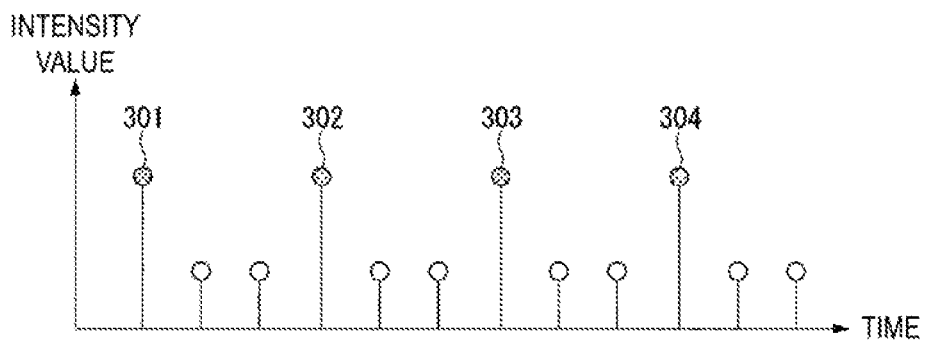
FIG. 5 is a diagram illustrating the configuration of tap coefficients of initial values according to the first embodiment.
FIG. 6 is a diagram illustrating the configuration of tap coefficients that have converged according to the first embodiment.
FIG. 7 is a diagram illustrating an example of a digital signal output by an ADC unit according to the first embodiment.

As illustrated in FIG. 5, when the initial values of k tap coefficients $W_1$ to $W_k$ are represented as tap coefficients $W_{D1}$ to $W_{Dk}$, generally, only the initial value $W_{Di}$ of one tap coefficient $W_i$ is set in advance to have a value larger than initial values of the other tap coefficients. When this relation is represented using an expression, it becomes $W_{Di} > W_{D1}$, $W_{Di-1}$, $W_{Di+1}$ ... $W_{Dk}$. For example, the initial values are configured such that only the center tap coefficient, that is, $W_{Di}$ for which i=(k+1)/2, is "1," and the others are "0". Hereinafter, $W_{Di}$ will be referred to as a peak of the initial tap coefficients.

As illustrated in FIG. 6, tap coefficients $W_1$ to $W_k$, which have converged, acquired by calculating repetitively updated tap coefficients $W_{M1}$ to $W_{Mk}$ by the tap coefficient configuring unit 44 for one burst frame signal will be represented as tap coefficients $W_{C1}$ to $W_{Ck}$. Here, the tap coefficients $W_1$ to $W_k$ that have converged, that is, the tap coefficients $W_{C1}$ to $W_{Ck}$, are updated tap coefficients $W_{M1}$ to $W_{Mk}$ that have reached desired values with a predetermined criterion.

At this time, also for the tap coefficients $W_{C1}$ to $W_{Ck}$, one tap coefficient $W_{Cj}$ frequently has a value larger than those of the other tap coefficients. The "j"-th position, which is the position of the tap coefficient $W_{Cj}$, is not necessarily the position of the center. When this relation is represented using an expression, it becomes $W_{Cj} > W_{C1}$, ... $W_{Cj-1}$, $W_{Cj+1}$ ... $W_{Ck}$. Hereinafter, "$W_{Cj}$" will be referred to as a peak of tap coefficients that have converged.

It is known that a convergence time of the tap coefficients $W_1$ to $W_k$ becomes shorter as the tap coefficients $W_1$ to $W_k$ at a time when a burst frame signal is given and the tap coefficients $W_1$ to $W_k$ after convergence using the burst frame signal have closer values and becomes longer as the tap coefficients have values that are further apart.

The tap coefficients $W_1$ to $W_k$ at the time when the burst frame signal is given become the initial tap coefficients $W_{D1}$ to $W_{Dk}$ set in advance when a burst frame signal is initially given. The tap coefficients $W_1$ to $W_k$ at a time when a burst frame signal is given a second time or subsequent times become the tap coefficients $W_{C1}$ to $W_{Ck}$ after convergence according to the previous burst frame signal.

Assuming that a tap for which a sample signal corresponding to a symbol timing of the signal is given among the taps 40-1 to 40-$k$ in the adaptive equalization filter unit 134 is denoted as a tap 40-$t$, it is generally known that a tap coefficient $W_t$ given to the tap 40-$t$ reaches a maximum value after convergence.

Based on this, in a case that a peak tap coefficient $W_i$ is given to the i-th tap 40-$i$, by causing the tap 40-$i$ and the tap 40-$t$ to which a sample signal corresponding to the symbol timing is given to coincide with each other, the tap coefficients $W_1$ to $W_k$ can be caused to converge in a short convergence time.

In a burst frame signal included in a digital signal obtained by performing oversampling with m times the symbol rate using the ADC unit 12, in most cases, a sample signal corresponding to a symbol timing within each symbol appears in every m samples. For example, in the case of m=3, as illustrated in FIG. 7, sample signals corresponding to the symbol timing appear at positions denoted by reference signs 301, 302, 303, and 304.

Figure 8:
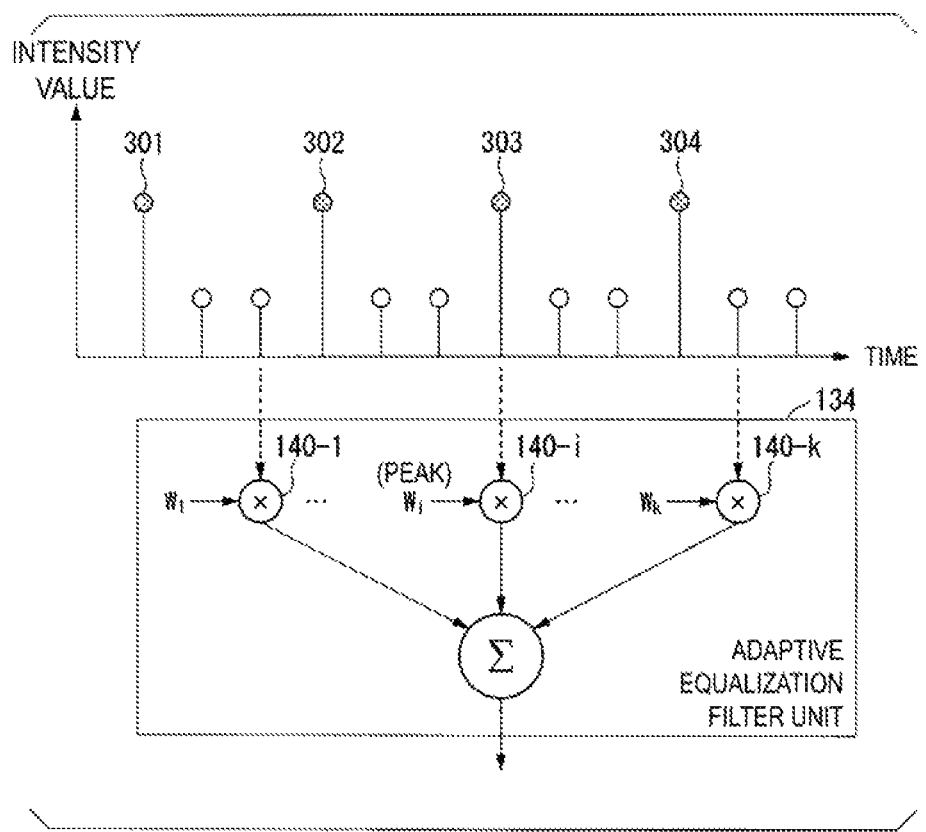
FIG. 8 is a diagram illustrating an example (1) in which a digital signal is given to an adaptive equalization filter unit.
Figure 9:
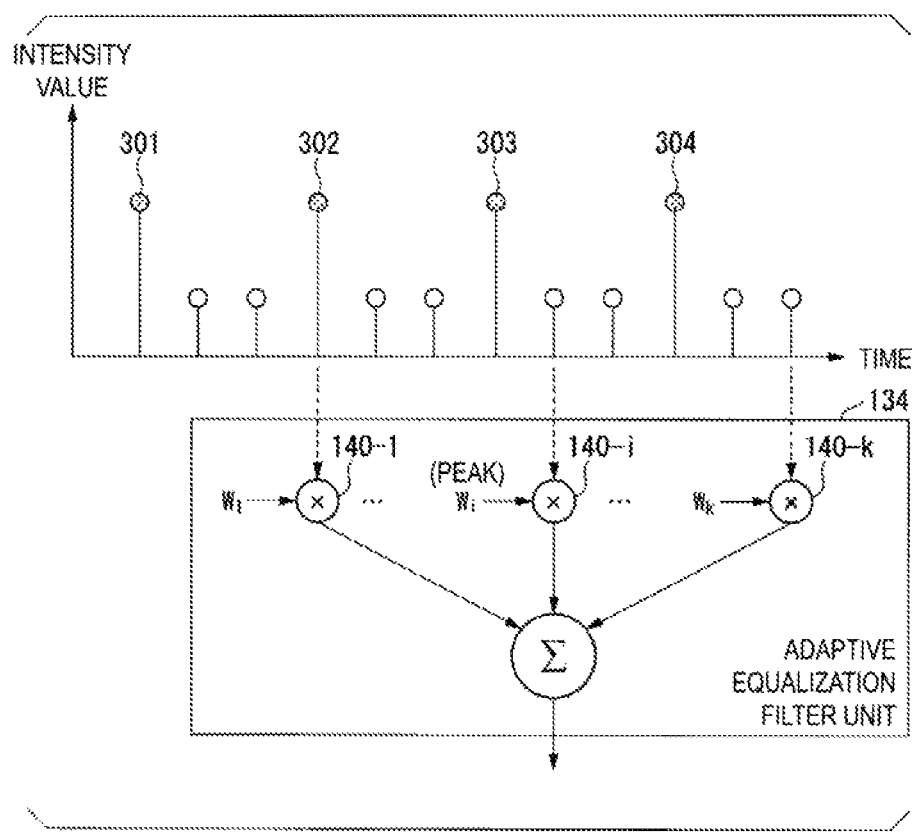
FIG. 9 is a diagram illustrating an example (2) in which a digital signal is given to an adaptive equalization filter unit.

It is assumed that a main signal output by the symbol timing detecting unit 132, that is, a burst frame signal, is directly used as a filter input signal of the adaptive equalization filter unit 134. In such a case, as illustrated in FIG. 8, a sample signal 303 corresponding to a symbol timing is given to the multiplier 140-$i$ to which the peak tap coefficient $W_i$ is given with the probability of 1/m. On the other hand, as illustrated in FIG. 9, none of the sample signals 301, 302, 303, and 304 corresponding to the symbol timing is given to the multiplier 140-$i$ to which the peak tap coefficient $W_i$ is given with the probability of (m−1)/m.

Whether any one of the sample signals 301, 302, 303, and 304 corresponding to the symbol timing is given to the multiplier 140-$i$ to which the peak tap coefficient $W_i$ is given depends randomly on a timing at which the signal processing unit 13 takes in a digital signal. For this reason, in a case that the main signal of the symbol timing detecting unit 132 is directly used as the filter input signal of the adaptive equalization filter unit 134, the convergence time can be shortened for 1/m of the entire burst frame signal. On the other hand, the convergence time becomes long for (m−1)/m of the entire burst frame signal.

Figure 10:
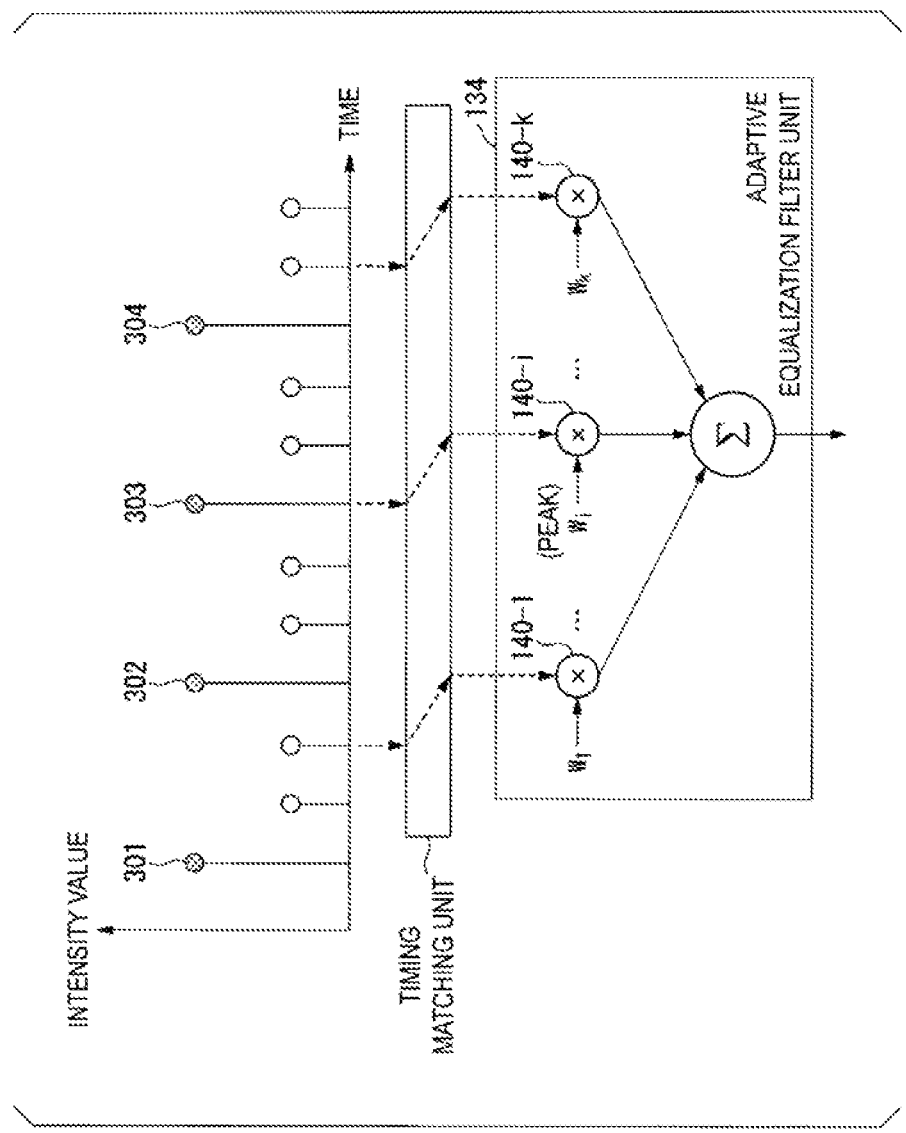
FIG. 10 is a diagram illustrating an example of timing matching using a timing matching unit according to the first embodiment.

Thus, as illustrated in FIG. 10, the timing matching unit 133 matches the timing such that a sample signal corresponding to the symbol timing of the main signal output by the symbol timing detecting unit 132 is given to the multiplier 140-$i$ to which the peak tap coefficient $W_i$ is given. The filter input signal extracting unit 49 of the adaptive equalization filter unit 134 outputs a filter input signal by delaying the main signal by m samples each time. For this reason, when the timing of the first filter input signal obtained from a burst frame signal is matched, timings of filter input signals thereafter are matched as well. In this way, the adaptive equalization filter unit 134 can constantly cause the tap coefficients $W_1$ to $W_k$ to converge in a short time. In the timing matching unit 133 according to the first embodiment, the timing is matched by the input timing adjusting unit 30 adjusting a timing at which a main signal is output.

Process Using Signal Processing Unit According to First Embodiment

Figure 11:
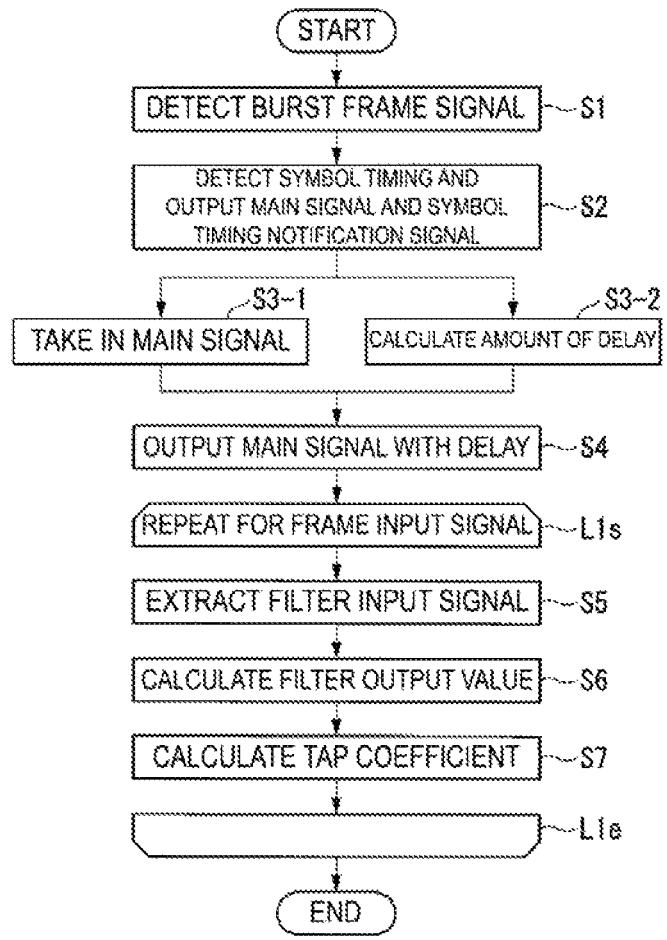
FIG. 11 is a flowchart illustrating a process performed by a signal processing unit according to the first embodiment.

Next, the process of the signal processing unit 13 according to the first embodiment will be described with reference to FIG. 11 and FIG. 12. FIG. 11 is a flowchart illustrating a process performed by the signal processing unit 13 according to the first embodiment. When any one of the optical transmission devices 51-1 to 51-N transmits a burst optical signal, the light reception unit 11 of the optical reception device 10 receives the burst optical signal, converts the burst optical signal into an electric signal, and outputs the electric signal.

The ADC unit 12 converts an analog electric signal output by the light reception unit 11 into a digital signal by oversampling the electric signal at a sampling rate that is m times the symbol rate of the burst optical signal and outputs the digital signal. The frame detecting unit 131 of the signal processing unit 13 detects a burst frame signal from the digital signal output by the ADC unit 12 and outputs the detected burst frame signal to the symbol timing detecting unit 132 (step S1).

The symbol timing detecting unit 132 takes in the burst frame signal output by the frame detecting unit 131 and detects a symbol timing included in the burst frame signal that has been taken in. As a technique for the symbol timing detecting unit 132 to detect a symbol timing, for example, a maximum amplitude method (MAM) disclosed in the following reference literature is applied.

"Reference literature: Seiichi Sampei; Kamilo Feher; Yukiyoshi Kamio, "Symbol timing synchronization scheme for 16 QAM/TDMA systems", Communications Research Laboratory, June 1995, Vol. 41, No. 2, pp. 189-196"

The MAM is a technique that can be used in a case that a modulation scheme in which an amplitude A of a sample signal corresponding to a symbol timing becomes larger than amplitudes A of the other sample signals, for example, binary phase shift keying (BPSK), quadrature phase shift keying (QPSK), or the like is applied. Here, the optical transmission devices 51-1 to 51-N on the transmission side are assumed to employ a modulation scheme in which the amplitude A of the sample signal corresponding to the symbol timing of BPSK, QPSK, or the like is larger than the amplitudes A of the other sample signals.

Figure 12:
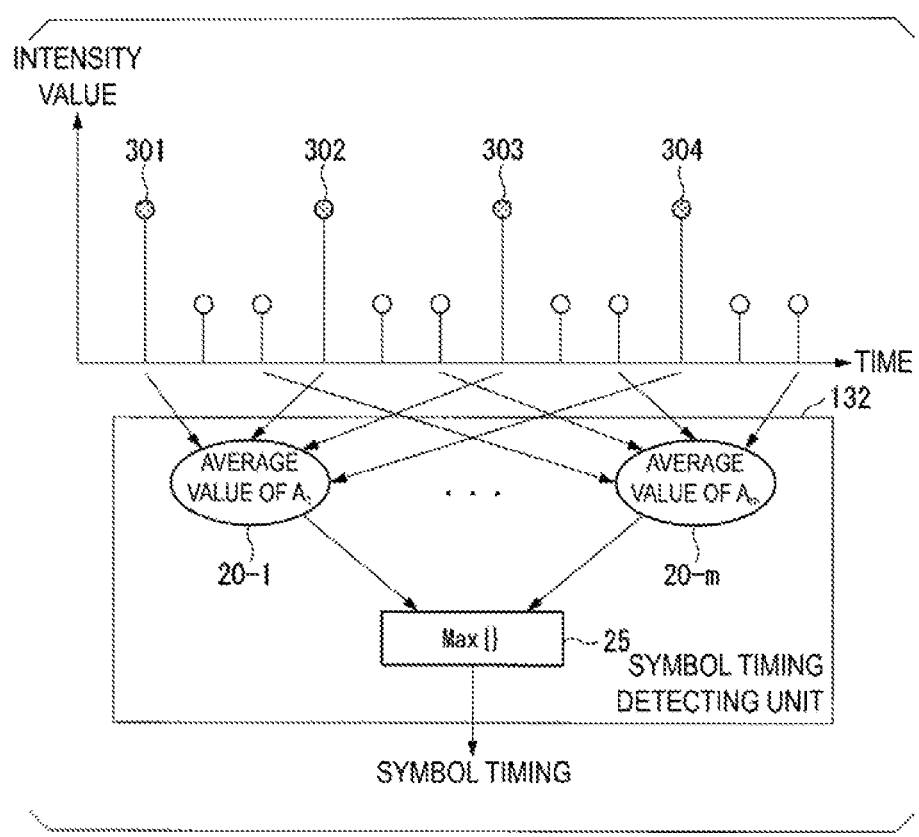
FIG. 12 is a diagram illustrating an example of a process performed by a symbol timing detecting unit according to the first embodiment.

As illustrated in FIG. 12, the MAM is a technique in which an average value of the amplitudes A is calculated for each m sample signals, and a sample signal having a maximum average value among the calculated averages of the m amplitude values is detected as a sample signal corresponding to the symbol timing. A value other than the average value of the amplitudes A that represents the same trend as that of the average value, for example, a total value of the amplitudes A, may be configured to be calculated.

When a symbol timing is detected, the symbol timing detecting unit 132 generates a symbol timing notification signal including information that represents the detected symbol timing. The symbol timing detecting unit 132 sets the taken-in burst frame signal as a main signal and outputs the main signal and the generated symbol timing notification signal to the timing matching unit 133 (step S2).

The delay unit 31 of the input timing adjusting unit 30 included in the timing matching unit 133 takes in the main signal output by the symbol timing detecting unit 132 and writes the taken-in main signal in a storage area such as an internal buffer to be stored therein (step S3-1).

The delay amount calculating unit 32 of the input timing adjusting unit 30 included in the timing matching unit 133 takes in the symbol timing notification signal output by the symbol timing detecting unit 132. The delay amount calculating unit 32 calculates an amount of delay based on information representing the symbol timing included in the taken-in symbol timing notification signal and position information of a peak tap coefficient stored in the storage unit 135. The calculated amount of delay is a difference between the information representing the symbol timing, in other words, the position of a sample signal corresponding to the symbol timing, and the position of the peak tap coefficient on a time axis. By delaying the output of the main signal by a time corresponding to the amount of delay, the position of the sample signal corresponding to the symbol timing and the position of the peak tap coefficient can be matched.

The delay amount calculating unit 32 outputs the calculated amount of delay to the delay unit 31 (step S3-2). Here, the amount of delay calculated by the delay amount calculating unit 32 is, for example, an amount that discretely changes from 0 to (m−1)T/m with a T/m increment each time, and one amount of delay is calculated for every one main signal, that is, one burst frame signal. After waiting for a time corresponding to the amount of delay received from the delay amount calculating unit 32, the delay unit 31 reads a main signal from the internal storage area and outputs the read main signal to the adaptive equalization filter unit 134 (step S4).

The adaptive equalization filter unit 134 takes in the main signal output by the delay unit 31 and repeats processes of step S5 and step S6 described below for one main signal, that is, one burst frame signal (Loop L1s to L1e).

The filter input signal extracting unit 49 takes in the main signal, extracts k sample signals from the main signal as filter input signals at a first cycle of the loop process, extracts k sample signals, which have been delayed by the m samples each time, from the main signal, and outputs the extracted signals as filter input signals at a second cycle and the subsequent cycles (step S5).

Each of the taps 40-1 to 40-$k$ of the adaptive equalization filter unit 134 takes in a filter input signal output by the filter input signal extracting unit 49. When the taps 40-1 to 40-$k$ take in first filter input signals, initial tap coefficients $W_{D1}$ to $W_{Dk}$ stored in the storage unit 42 are given to the multipliers 140-1 to 140-$k$ of the taps 40-1 to 40-$k$ by the tap coefficient configuring unit 44.

The multipliers 140-1 to 140-$k$ respectively multiply k sample signals included in the filter input signals by the initial tap coefficients $W_{D1}$ to $W_{Dk}$ and output products obtained through the multiplication to the adder 41. The adder 41 calculates a filter output value by adding the products and outputs the filter output value (step S6).

The tap coefficient calculating unit 43 takes in the filter output value output by the adder 41, reads the reference value stored in the storage unit 42, and calculates updated tap coefficients $W_{M1}$ to $W_{Mk}$ based on the filter output value and the reference value, for example, using an algorithm such as a least squares method described above (step S7).

The tap coefficient configuring unit 44 outputs the updated tap coefficients $W_{M1}$ to $W_{Mk}$ calculated by the tap coefficient calculating unit 43 to the multipliers 140-1 to 140-$k$, respectively, and performs the next loop process.

During a frame input signal obtained from a part corresponding to the preamble 601 included in one burst frame signal, the tap coefficients $W_{M1}$ to $W_{Mk}$ of the updated values calculated by the tap coefficient calculating unit 43 converge on an almost fixed value, and this fixed value becomes the optimal converged tap coefficients $W_{C1}$ to $W_{Ck}$ for the burst frame signal.

When any one of the other optical transmission devices 51-1 to 51-N transmits a burst optical signal, the light reception unit 11 of the optical reception device 10 receives the burst optical signal, and the ADC unit 12 outputs a digital signal, the signal processing unit 13 performs the processes the flowchart of FIG. 11 again.

By employing the configuration according to the first embodiment described above, in the signal processing unit 13 included in the optical reception device 10 that receives a burst optical signal transmitted by one of the plurality of optical transmission devices 51-1 to 51-N, the symbol timing detecting unit 132 detects a symbol timing included in a sample signal obtained by oversampling the burst optical signal converted into an electric signal with a sampling rate higher than the symbol rate. The adaptive equalization filter unit 134 performs an equalization process on the sample signals. When the adaptive equalization filter unit 134 takes in sample signals, the timing matching unit 133 matches the timings such that a sample signal corresponding to the symbol timing is given to one of the taps 40-1 to 40-$k$ of which the tap coefficient has a maximum value among the taps 40-1 to 40-$k$ included in the adaptive equalization filter unit 134. In this way, the sample signal corresponding to the symbol timing and a peak tap coefficient can be given to the same taps 40-1 to 40-$k$. For this reason, in calculation of optimal tap coefficients that is performed each time a burst optical signal is received, the number of iterations of feedback calculation can be reduced, and the convergence time can be shortened.

Furthermore, the timing matching unit 133 according to the first embodiment includes the input timing adjusting unit 30, and the input timing adjusting unit 30 takes in sample signals and adjusts timings at which the taken-in sample signals are output to the adaptive equalization filter unit 134, thereby giving a sample signal corresponding to the symbol timing to one of the taps 40-1 to 40-$k$ of which a tap coefficient has a maximum value.

The adjustment of timings using the input timing adjusting unit 30 is performed by the delay unit 31 and the delay amount calculating unit 32 both included in the input timing adjusting unit 30. The delay amount calculating unit 32 calculates an amount of delay based on the symbol timing detected by the symbol timing detecting unit 132 and the position of the tap of which a tap coefficient has a maximum value. The delay unit 31 takes in a sample signal and outputs the sample signal with delay corresponding to the amount of delay calculated by the delay amount calculating unit 32 to the adaptive equalization filter unit 134. The delay unit 31 outputs each sample signal with delay, and therefore, a sample signal corresponding to the symbol timing included in the main signal is given to one of the taps 40-1 to 40-$k$ of which a tap coefficient has a maximum value.

When the delay unit 31 of the input timing adjusting unit 30 outputs a main signal corresponding to the first burst frame signal to the adaptive equalization filter unit 134, the tap coefficients $W_1$ to $W_k$ are the initial tap coefficients $W_{D1}$ to $W_{Dk}$. Thereafter, in the process of repeatedly calculating the updated tap coefficients $W_{M1}$ to $W_{Mk}$ using the tap coefficient calculating unit 43, the updated tap coefficients $W_{M1}$ to $W_{Mk}$ converge on tap coefficients $W_{C1}$ to $W_{Ck}$ that are optimal for performing an adaptive equalization filtering process on the burst frame signal.

The delay unit 31 of the input timing adjusting unit 30 performs adjustment based on the amount of delay calculated by the delay amount calculating unit 32 such that a sample signal corresponding to a symbol timing of the burst frame signal is given to the i-th tap 40-$i$ to which a maximum value of the initial tap coefficients $W_{D1}$ to $W_{Dk}$ is given. The filter input signal extracting unit 49 of the adaptive equalization filter unit 134 outputs a filter input signal by delaying the main signal by m samples each time. For this reason, even when the values of the tap coefficients $W_{C1}$ to $W_{Ck}$ after convergence change, it is assumed that the position of the peak remains at the tap 40-$i$ in most cases.

Thereafter, when the delay unit 31 of the input timing adjusting unit 30 outputs a main signal corresponding to a next burst frame signal to the adaptive equalization filter unit 134, the tap coefficients $W_1$ to $W_k$ of the adaptive equalization filter unit 134 are the tap coefficients $W_{C1}$ to $W_{Ck}$ that are optimal to the previous burst frame signal. As described above, in many cases, the position of the peak of the tap coefficients $W_{C1}$ to $W_{Ck}$ coincides with the i-th position that is the position of the peak of the initial tap coefficients $W_{D1}$ to $W_{Dk}$. For this reason, also for the next burst frame signal, a sample signal corresponding to the symbol timing is given to the tap 40-$i$ in accordance with the matching of timings using the input timing adjusting unit 30.

As a result, also for all the burst frame signals thereafter, a sample signal corresponding to the symbol timing can be given to the tap 40-$i$; and compared to a case that a burst frame signal is given to the adaptive equalization filter unit 134 without adjusting the timing used the input timing adjusting unit 30, the time for causing the tap coefficients $W_1$ to $W_k$ to converge can be shortened.

Another Configuration Example According to First Embodiment

Figure 13:
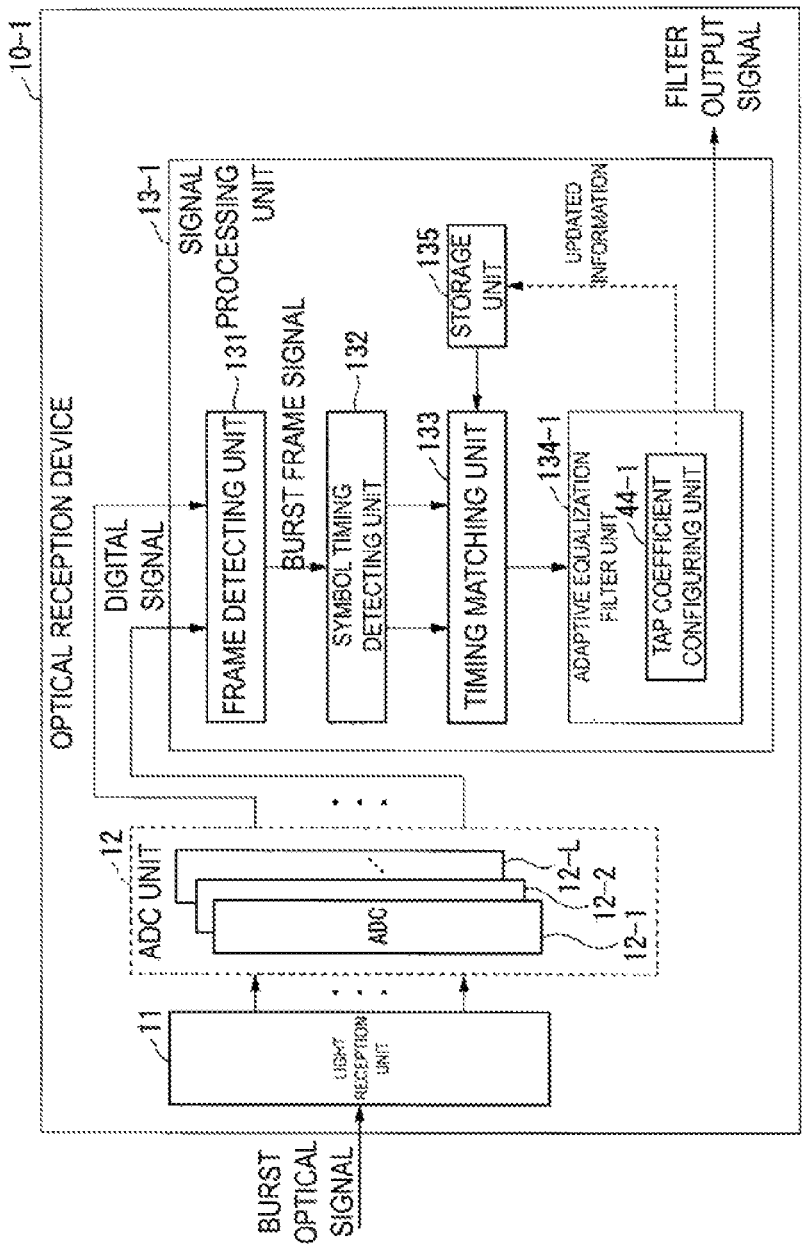
FIG. 13 is a block diagram illustrating another configuration example of the optical reception device according to the first embodiment.

FIG. 13 is a block diagram illustrating the configuration of an optical reception device 10-1 that is another configuration example of the optical reception device 10 according to the first embodiment. The optical reception device 10-1 includes an adaptive equalization filter unit 134-1 in place of the adaptive equalization filter unit 134 included in the optical reception device 10. The adaptive equalization filter unit 134-1 includes a tap coefficient configuring unit 44-1 in place of the tap coefficient configuring unit 44.

The tap coefficient configuring unit 44-1 is connected to the storage unit 135 and rewrites position information of the peak tap coefficient stored in the storage unit 135.

In other words, when the initial tap coefficients $W_{D1}$ to $W_{Dk}$ are read from the storage unit 42, the tap coefficient configuring unit 44-1 writes information representing the position of the tap 40-$i$ that outputs a maximum value among the initial values in the storage unit 135 to be stored in the storage unit 135.

When the process for all of the frame input signals obtained from one burst frame signal ends, in other words, when the process illustrated in FIG. 11 ends, the tap coefficient configuring unit 44-1 detects the position of a maximum value among the tap coefficients $W_{M1}$ to $W_{Mk}$ that have been received last from the tap coefficient calculating unit 43. In other words, the tap coefficients $W_{M1}$ to $W_{Mk}$ that have been received last from the tap coefficient calculating unit 43 are converged tap coefficients $W_{C1}$ to $W_{Ck}$, and thus the tap coefficient configuring unit 44-1 detects the position of a maximum value among the converged tap coefficients $W_{C1}$ to $W_{Ck}$.

The tap coefficient configuring unit 44-1 writes information representing the position of a maximum value among the detected tap coefficients $W_{C1}$ to $W_{Ck}$ in the storage unit 135 as position information of the peak tap coefficient to be stored in the storage unit 135. In addition, the timing at which the process illustrated in FIG. 11 ends is detected, for example, by the tap coefficient configuring unit 44-1 when the tap coefficients $W_{M1}$ to $W_{Mk}$ of new updated values are not output from the tap coefficient calculating unit 43 for a predetermined time set in advance, for example, a time longer than an operation time during which the tap coefficient calculating unit 43 performs calculation once.

By employing the configuration of the optical reception device 10-1, even in a case that, for example, the peak of the converged tap coefficients $W_{C1}$ to $W_{Ck}$ deviates from the "i-th" position, which is the position of the peak of the initial values, to a "j-th" position, the position of the peak tap coefficient stored in the storage unit 135 can be changed. For this reason, when a main signal corresponding to a new burst frame signal is output, the input timing adjusting unit 30 can constantly give sample signals corresponding to the symbol timing to the taps 40-1 to 40-k corresponding to the position information of the peak tap coefficient. As a result, the number of iterations of feedback calculation can be reduced, and the convergence time can be shortened.

Second Embodiment

Figure 14:
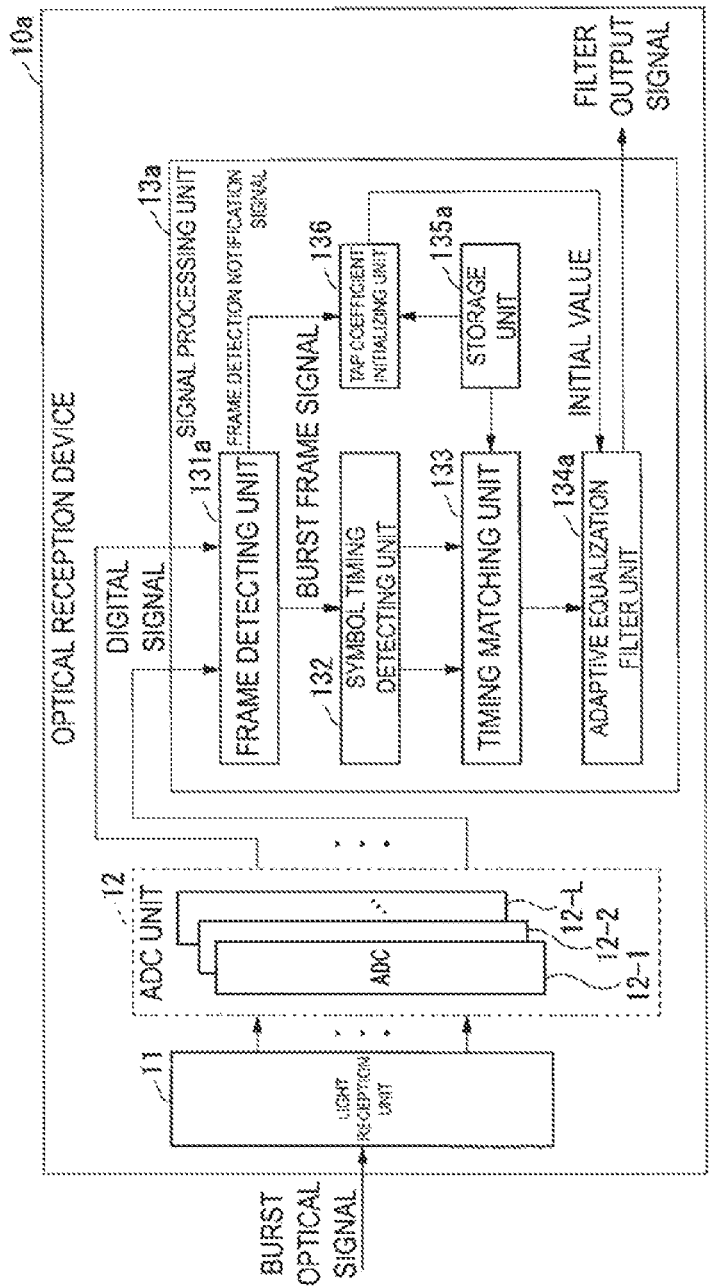
FIG. 14 is a block diagram illustrating the configuration of an optical reception device of a station-side communication apparatus according to a second embodiment.

FIG. 14 is a block diagram illustrating an internal configuration of an optical reception device 10a according to a second embodiment. Although not illustrated, for convenience of description, the communication system 1a according to the second embodiment includes a station-side communication apparatus 5a that includes the optical reception device 10a according to the second embodiment, and subscriber-side communication apparatuses 50-1 to 50-N and an optical coupler 60 having the same configurations as those according to the first embodiment. In the optical reception device 10a according to the second embodiment, the same reference signs will be assigned to the same components as those of the optical reception device 10 according to the first embodiment, and hereinafter, different components will be described.

The optical reception device 10a includes a light reception unit 11, an ADC unit 12, and a signal processing unit 13a. The signal processing unit 13a includes a frame detecting unit 131a, a symbol timing detecting unit 132, a timing matching unit 133, an adaptive equalization filter unit 134a, a storage unit 135a, and a tap coefficient initializing unit 136.

In the signal processing unit 13a, when a burst frame signal is detected from a digital signal, the frame detecting unit 131a outputs a frame detection notification signal representing that the burst frame signal has been detected to the tap coefficient initializing unit 136. In addition, the frame detecting unit 131a outputs the detected burst frame signal to the symbol timing detecting unit 132.

Figure 15:
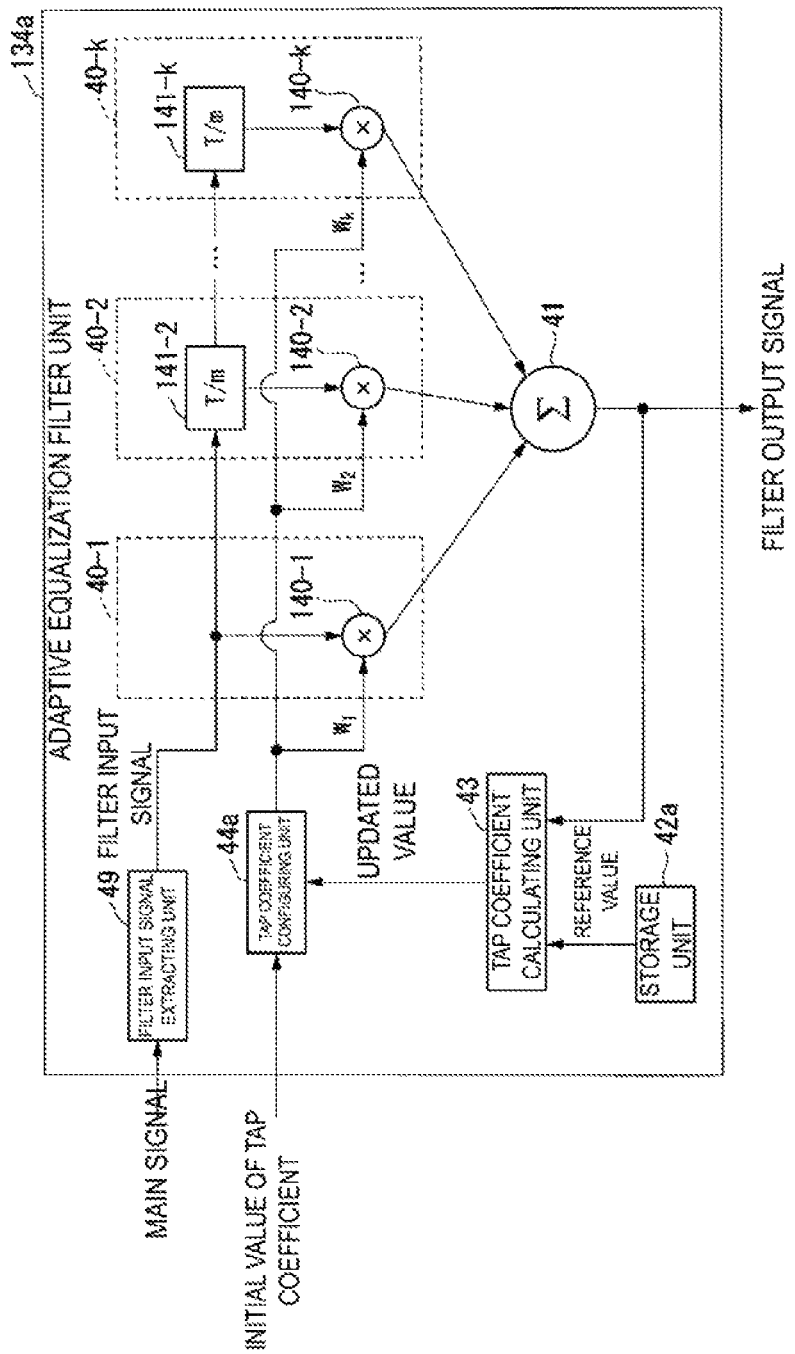
FIG. 15 is a diagram illustrating an internal configuration of an adaptive equalization filter unit according to the second embodiment.

The adaptive equalization filter unit 134a has the internal configuration illustrated in FIG. 15 and includes a plurality of taps 40-1 to 40-k, an adder 41, a storage unit 42a, a tap coefficient calculating unit 43, a tap coefficient configuring unit 44a, and a filter input signal extracting unit 49. The storage unit 42a stores only reference values such as target values of filter output values without storing the initial tap coefficients $W_{D1}$ to $W_{Dk}$ that are stored in the storage unit 42 according to the first embodiment.

In a case that the tap coefficient calculating unit 43 outputs updated tap coefficients $W_{M1}$ to $W_{Mk}$, the tap coefficient configuring unit 44a outputs the updated tap coefficients $W_{M1}$ to $W_{Mk}$ to taps 40-1 to 40-k, respectively. In a case that tap coefficients $W_1$ to $W_k$ are received from the outside, even when the updated tap coefficients $W_{M1}$ to $W_{Mk}$ are received from the tap coefficient calculating unit 43, the tap coefficient configuring unit 44a outputs the tap coefficients $W_1$ to $W_k$ received from the outside to the taps 40-1 to 40-k with priority.

Figure 16:
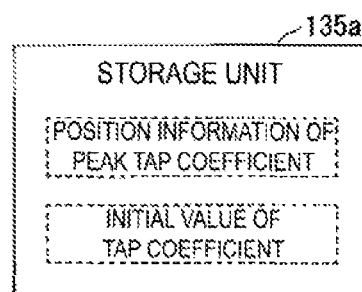
FIG. 16 is a diagram illustrating a data configuration stored in a storage unit of an optical reception device according to the second embodiment.

As illustrated in FIG. 16, the storage unit 135a stores position information of a peak tap coefficient and initial values of the tap coefficients $W_1$ to $W_k$, that is, the tap coefficients $W_{D1}$ to $W_{Dk}$, in advance. In a case that a frame detection notification signal has been received from the frame detecting unit 131a, the tap coefficient initializing unit 136 reads the initial tap coefficients $W_{D1}$ to $W_{Dk}$ from the storage unit 135a and outputs the read initial tap coefficients $W_{D1}$ to $W_{Dk}$ to the tap coefficient configuring unit 44a of the adaptive equalization filter unit 134a.

Figure 17:
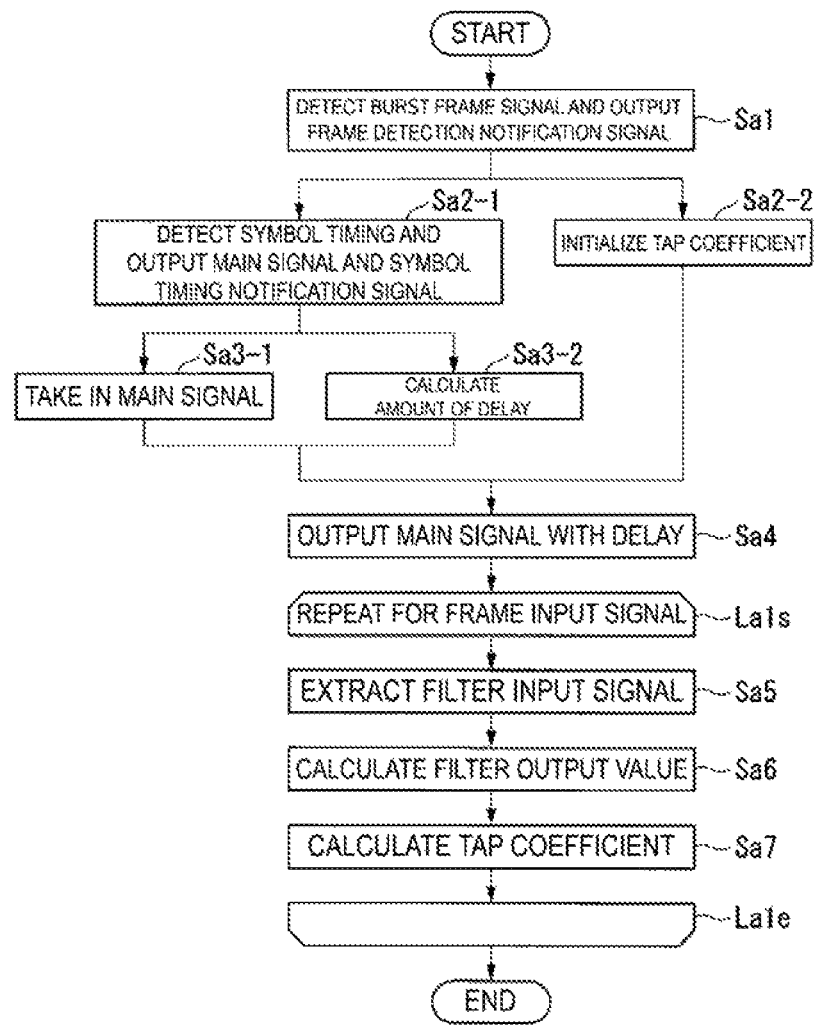
FIG. 17 is a flowchart illustrating a process performed by a signal processing unit according to the second embodiment.

Process performed by signal processing unit according to second embodiment Next, the process of the signal processing unit 13a according to the second embodiment will be described with reference to a flowchart illustrated in FIG. 17. The frame detecting unit 131a of the signal processing unit 13a detects a burst frame signal from a digital signal output by the ADC unit 12 and outputs the detected burst frame signal to the symbol timing detecting unit 132. In addition, when the burst frame signal is detected, the frame detecting unit 131a outputs a frame detection notification signal to the tap coefficient initializing unit 136 (step Sa1).

The symbol timing detecting unit 132 performs the same process as that of step S2 according to the first embodiment, sets the taken-in burst frame signal as a main signal, and outputs the main signal and the generated symbol timing notification signal to the timing matching unit 133 (step Sa2-1).

When the frame detection notification signal is received from the frame detecting unit 131a, the tap coefficient initializing unit 136 reads the initial tap coefficients $W_{D1}$ to $W_{Dk}$ from the storage unit 135a. The tap coefficient initializing unit 136 outputs the read initial tap coefficients $W_{D1}$ to $W_{Dk}$ to the tap coefficient configuring unit 44a of the adaptive equalization filter unit 134a (step Sa2-2).

In steps Sa3-1, Sa3-2, and Sa4, the same processes as those of steps S3-1, S3-2, and S4 according to the first embodiment are performed by the input timing adjusting unit 30 of the timing matching unit 133.

In addition, in a loop La1s to La1e that is an iterative process and steps Sa5, Sa6, and Sa1 within the loop, the same processes as those of the loop L1s to L1e and steps S5, S6, and S7 within the loop according to the first embodiment are performed by the adaptive equalization filter unit 134a. At the time of the process of step Sa6 for a first frame input signal, the tap coefficient configuring unit 44a outputs the initial tap coefficients $W_{D1}$ to $W_{Dk}$ received from the tap coefficient initializing unit 136, to the multipliers 140-1 to 140-k.

When any one of the other optical transmission devices 51-1 to 51-N transmit a burst optical signal, the light reception unit 11 of the optical reception device 10a receives the burst optical signal, and the ADC unit 12 outputs a digital signal, the signal processing unit 13a performs a process of a flowchart of FIG. 17 again.

Every time the frame detecting unit 131a detects a new burst frame signal in accordance with the process of step Sa2-2 described above, the tap coefficient initializing unit 136 outputs the initial tap coefficients $W_{D1}$ to $W_{Dk}$ to the tap coefficient configuring unit 44a of the adaptive equalization filter unit 134a. For this reason, the tap coefficients $W_1$ to $W_k$ are initialized for each burst frame signal.

By employing the configuration according to the second embodiment described above, the frame detecting unit 131a detects a part corresponding to a frame of a burst optical signal from a digital signal corresponding to the burst optical signal as a burst frame signal. In a case that the frame detecting unit 131a detects a new burst frame signal, the tap coefficient initializing unit 136 sets the tap coefficients $W_1$ to $W_k$ of the taps 40-1 to 40-k of the adaptive equalization filter unit 134 to initial values set in advance.

In the optical reception device 10 according to the first embodiment, when the adaptive equalization filter unit 134 performs a process on a second burst frame signal and subsequent burst frame signals in a time series, the tap coefficients $W_1$ to $W_k$ have converged on an optimal value for the optical transmission devices 51-1 to 51-N that are transmission sources of the previous burst frame signal. Also in this case, when the position of one of the taps 40-1 to 40-$i$ of which tap coefficients $W_1$ to $W_k$ become a peak does not change or the position of the peak of the taps 40-1 to 40-$i$ is configured to be updated like the optical reception device 10-1, the convergence time can be shortened.

On the other hand, for example, for the optical transmission devices 51-1 to 51-N that are transmission sources, there may be large differences in the characteristics and transmission distances to the optical reception device 10$a$. In such a case, there are cases in which the initial tap coefficients $W_{D1}$ to $W_{Dk}$ have a shorter convergence time of the tap coefficients $W_1$ to $W_k$ than those of the tap coefficients $W_{C1}$ to $W_{Ck}$ that have converged in accordance with the previous burst frame signal.

In such cases, by applying the optical reception device 10$a$ according to the second embodiment, the tap coefficients $W_1$ to $W_k$ of the adaptive equalization filter unit 134$a$ can be returned to the initial tap coefficients $W_{D1}$ to $W_{Dk}$ each time a new burst frame signal is detected. In accordance with this, even in a case that there are large differences in the characteristics and transmission distances to the optical reception device 10$a$ for the optical transmission devices 51-1 to 51-N that are transmission sources, the number of iterations of feedback calculation is reduced, and a convergence time of the tap coefficients $W_1$ to $W_k$ can be shortened.

In the configuration according to the second embodiment described above, the tap coefficient initializing unit 136 may be configured to be included inside the adaptive equalization filter unit 134$a$.

Third Embodiment

Figure 18:
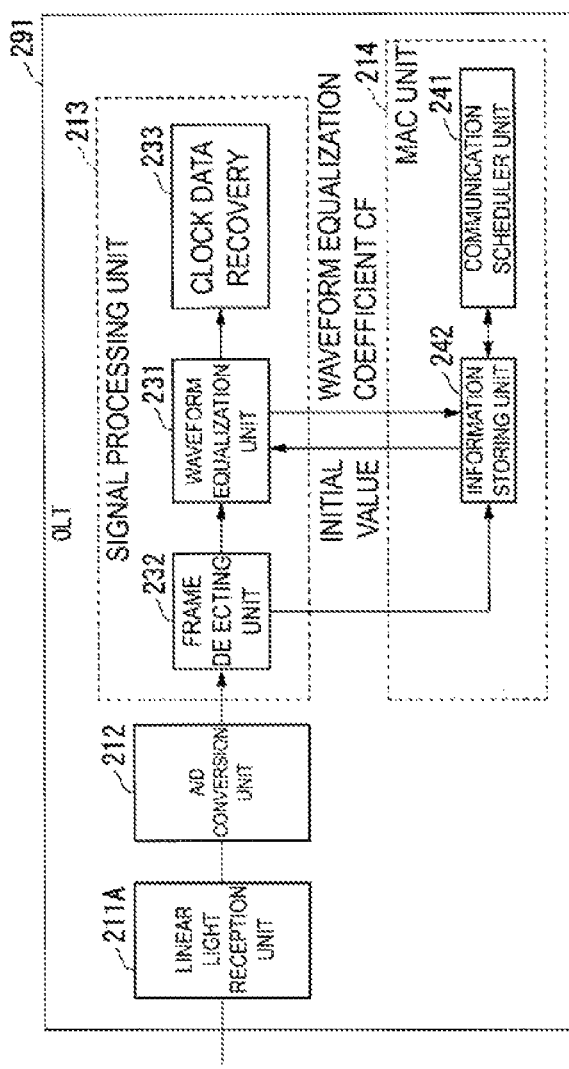
FIG. 18 is a block diagram illustrating an internal configuration of an OLT disclosed in PTL1.

A technique for shortening a convergence time of tap coefficients disclosed in PTL1 described above will be described with reference to the drawings. FIG. 18 is a diagram in which reference signs of FIG. 3 in PTL1 are replaced. FIG. 18 is a block diagram illustrating the configuration of an optical line terminal (OLT) 291 that is a station-side communication apparatus in the PON system. Although tap coefficients used for adaptive equalization filtering are described as waveform equalization coefficients CF in PTL1, for convenience of description, the waveform equalization coefficients CF will be described as the tap coefficients. An information storing unit 242 of the OLT 291 stores optimal tap coefficients for each transmission source of a burst frame signal in an internal storage area in advance in association with the transmission source.

A communication scheduler unit 241 performs DBA and outputs DBA scheduling information obtained through the DBA. The information storing unit 242 detects a transmission source that has transmitted a burst frame signal and a timing at which the burst frame signal has been taken in by a waveform equalization unit 231 based on the scheduling information output by the communication scheduler unit 241 and a frame detection notification signal output by a frame detecting unit 232.

Next, the information storing unit 242 reads tap coefficients corresponding to the transmission source of the burst frame signal taken in by the waveform equalization unit 231 from the internal storage area and initializes the tap coefficients of the waveform equalization unit 231 with the read tap coefficients. When the waveform equalization unit 231 ends the process of adaptive equalization filtering on one burst frame signal, the waveform equalization unit 231 outputs converged tap coefficients to the information storing unit 242 in association with the transmission source. When the tap coefficients associated with the transmission source are received from the waveform equalization unit 231, the information storing unit 242 detects an area in which the tap coefficients of the transmission source are stored from the internal storage area, and updates the tap coefficients of the transmission source by writing the tap coefficients received from the waveform equalization unit 231 in the detected area.

By performing the process described above, when the waveform equalization unit 231 takes in a new burst frame signal, the waveform equalization unit 231 can perform an adaptive equalization filtering process using tap coefficients calculated in advance, which are optimal for the transmission source of the burst frame signal. For this reason, in the technology disclosed in PTL1, the tap coefficients that have already been calculated are used, and therefore, compared to a case that tap coefficients optimal for the transmission source of the previous burst frame signal are used or any values are used for initial tap coefficients, the convergence time can be shortened. A configuration in which a technique for matching a symbol timing of the burst frame signal and a timing of the position of a peak tap coefficient is further combined with the technique disclosed in PTL1 is the third embodiment described below.

Configuration of Third Embodiment

Figure 19:
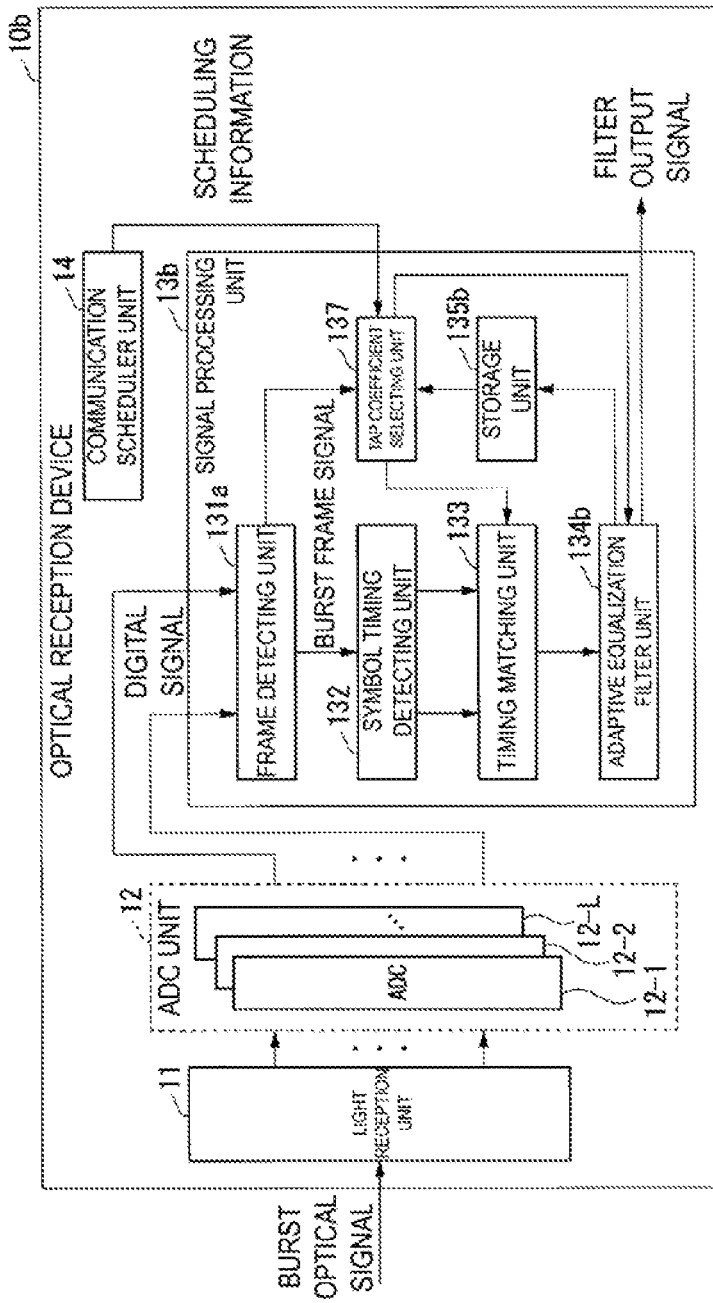
FIG. 19 is a block diagram illustrating the configuration of an optical reception device of a station-side communication apparatus according to a third embodiment.

FIG. 19 is a block diagram illustrating an internal configuration of an optical reception device 10$b$ according to the third embodiment. Although not illustrated, for convenience of description, a communication system 1$b$ according to the third embodiment includes a station-side communication apparatus 5$b$ that includes an optical reception device 10$b$ according to the third embodiment, and subscriber-side communication apparatuses 50-1 to 50-N and an optical coupler 60 that have the same configurations as those according to the first embodiment. In the optical reception device 10$b$ according to the third embodiment, the same reference signs will be assigned to the same components as those of the optical reception devices 10 and 10$a$ according to the first and second embodiments, and hereinafter, different components will be described.

The optical reception device 10$b$ includes a light reception unit 11, an ADC unit 12, a signal processing unit 13$b$, and a communication scheduler unit 14. The signal processing unit 13$b$ includes a frame detecting unit 131$a$, a symbol timing detecting unit 132, a timing matching unit 133, an adaptive equalization filter unit 134$b$, a storage unit 135$b$, and a tap coefficient selecting unit 137.

The communication scheduler unit 14 performs DBA and outputs DBA scheduling information obtained through the DBA. Here, the DBA scheduling information is information that represents a communication time, during which transmission of an uplink signal is permitted, allocated by the communication scheduler unit 14 for each of optical transmission devices 51-1 to 51-N of the subscriber-side communication apparatuses 50-1 to 50-N and includes identification information of each of the optical transmission devices 51-1 to 51-N and information representing a permitted communication time. Here, the identification information of each of the optical transmission devices 51-1 to 51-N is, for example, information such as a logical link ID (LLID) assigned to each optical network unit (ONU) in the PON system.

In the signal processing unit 13b, the storage unit 135b stores a tap coefficient table 1351 illustrated in FIG. 20. The tap coefficient table 1351 includes items "transmission source", "position of a peak tap coefficient", "tap coefficient 1", "tap coefficient 2", . . . , and "tap coefficient k".

In the item "transmission source", identification information that has been assigned to each of the optical transmission devices 51-1 to 51-N in advance is written.

In the item "position of a peak tap coefficient", position information of a tap coefficient of a peak representing a position of a maximum value among tap coefficients $W_1$ to $W_k$ written in corresponding items "tap coefficient 1", "tap coefficient 2", . . . , and "tap coefficient k" is written. In the items "tap coefficient 1", "tap coefficient 2", . . . , and "tap coefficient k", optimal tap coefficients $W_1$ to $W_k$ calculated in advance for burst frame signals acquired from optical signals transmitted by the optical transmission devices 51-1 to 51-N written in the item "transmission source" are respectively written.

The tap coefficient selecting unit 137 takes in scheduling information output by the communication scheduler unit 14. In addition, the tap coefficient selecting unit 137 includes a timing unit such as a clock therein and acquires time information of a time at which a frame detection notification signal is received when the frame detection notification signal output by the frame detecting unit 131a is received. In addition, the tap coefficient selecting unit 137 identifies identification information used for identifying one of the optical transmission devices 51-1 to 51-N that is a transmission source of a burst frame signal corresponding to the frame detection notification signal from the scheduling information based on the acquired time information and the scheduling information.

Furthermore, when identification information representing one of the optical transmission devices 51-1 to 51-N is identified, the tap coefficient selecting unit 137 reads position information of a peak tap coefficient and tap coefficients $W_1$ to $W_k$ corresponding to the identification information by referring to the tap coefficient table 1351 of the storage unit 135b. In addition, the tap coefficient selecting unit 137 outputs the position information of the peak tap coefficient corresponding to the read identification information to the delay amount calculating unit 32 of the input timing adjusting unit 30 of the timing matching unit 133. Furthermore, the tap coefficient selecting unit 137 outputs the tap coefficients $W_1$ to $W_k$ corresponding to the read identification information to the adaptive equalization filter unit 134b together with the identification information.

Figure 21:
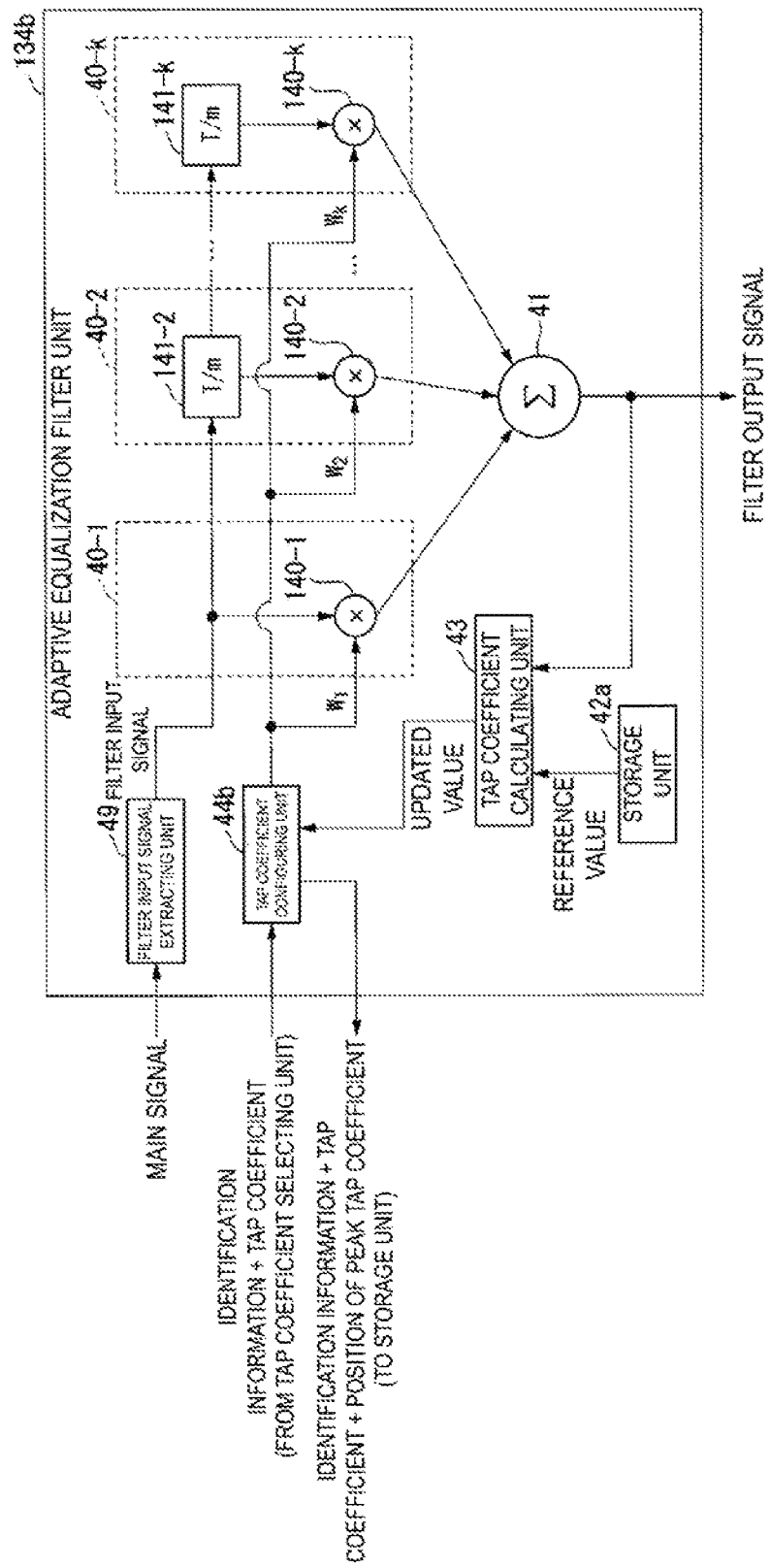
FIG. 21 is a diagram illustrating an internal configuration of an adaptive equalization filter unit according to the third embodiment.

The adaptive equalization filter unit 134b has an internal configuration illustrated in FIG. 21 and includes a plurality of taps 40-1 to 40-k, an adder 41, a storage unit 42a, a tap coefficient calculating unit 43, a tap coefficient configuring unit 44b, and a filter input signal extracting unit 49.

In a case that the tap coefficient calculating unit 43 outputs updated tap coefficients $W_{M1}$ to $W_{Mk}$, the tap coefficient configuring unit 44b outputs the updated tap coefficients $W_{M1}$ to $W_{Mk}$ to the taps 40-1 to 40-k, respectively. In addition, in a case that the tap coefficients $W_1$ to $W_k$ associated with the identification information have been received from the outside, the tap coefficient configuring unit 44b outputs the tap coefficients $W_1$ to $W_k$ received from the outside to the taps 40-1 to 40-k with priority even when the updated tap coefficients $W_1$ to $W_k$ are received from the tap coefficient calculating unit 43. Furthermore, the tap coefficient configuring unit 44b writes the identification information given from the outside in an internal storage area to be stored in an internal storage area.

When the process on the frame input signal extracted from one main signal by the filter input signal extracting unit 49 ends, the tap coefficient configuring unit 44b detects a position of a maximum value among the tap coefficients $W_{M1}$ to $W_{Mk}$ received from the tap coefficient calculating unit 43, that is, the converged tap coefficients $W_{C1}$ to $W_{Ck}$. In addition, the tap coefficient configuring unit 44b writes information representing the detected position of the maximum value among the tap coefficients $W_{C1}$ to $W_{Ck}$ in the item "position of a peak tap coefficient" of a record of the tap coefficient table 1351 of the storage unit 135b corresponding to the identification information stored in the internal storage area and updates each of the items "tap coefficient 1," "tap coefficient 2," . . . , and "tap coefficient k" by writing the tap coefficients $W_{C1}$ to $W_{Ck}$ in the items.

Figure 22:
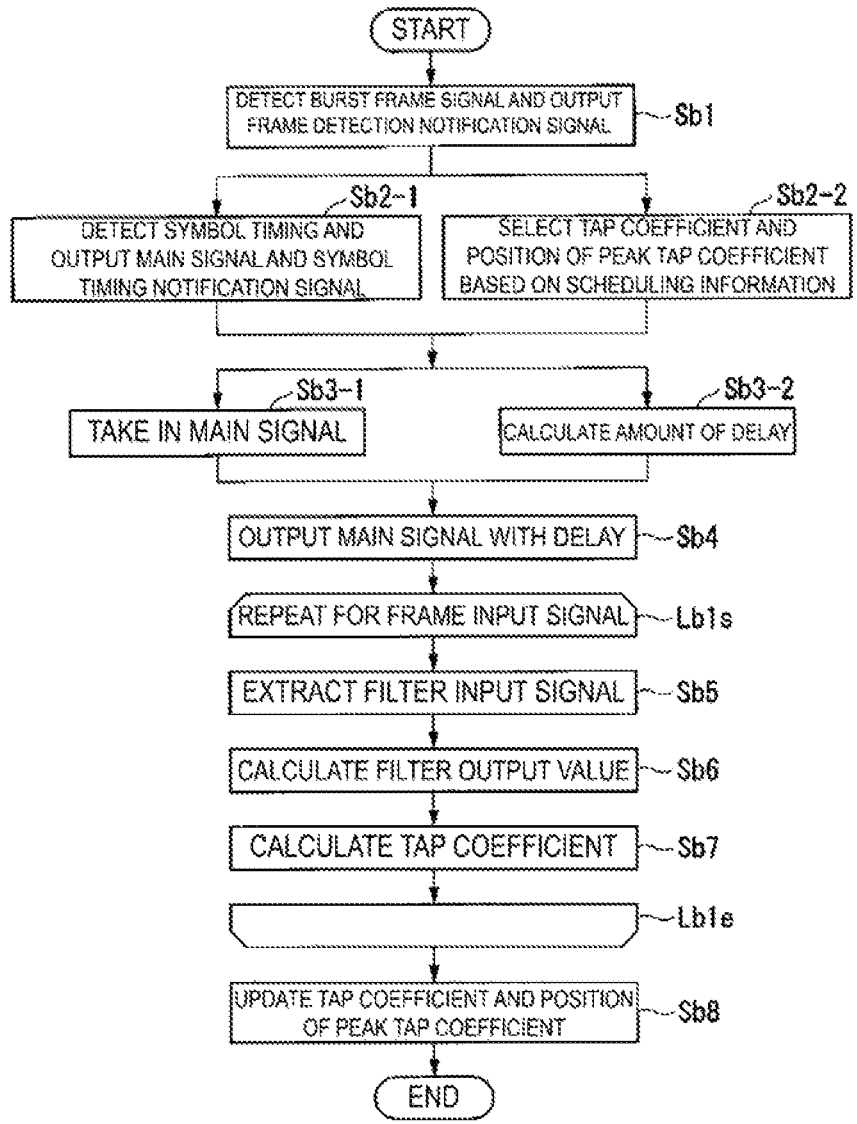
FIG. 22 is a flowchart illustrating a process performed by a signal processing unit according to the third embodiment.

Process performed by signal processing unit according to third embodiment Next, a process performed by the signal processing unit 13b according to the third embodiment will be described with reference to a flowchart illustrated in FIG. 22. The communication scheduler unit 14 outputs scheduling information every time DBA is performed, and the tap coefficient selecting unit 137 sequentially takes in scheduling information every time the communication scheduler unit 14 outputs the scheduling information.

The frame detecting unit 131a of the signal processing unit 13b detects a burst frame signal from a digital signal output by the ADC unit 12 and outputs the detected burst frame signal to the symbol timing detecting unit 132. When a burst frame signal is detected, the frame detecting unit 131a outputs a frame detection notification signal to the tap coefficient selecting unit 137 (step Sb1).

The symbol timing detecting unit 132 performs the same process as that of step S2 according to the first embodiment, sets a taken-in burst frame signal as a main signal, and outputs the main signal and the generated symbol timing notification signal to the timing matching unit 133 (step Sb2-1).

When the frame detection notification signal is received from the frame detecting unit 131a, the tap coefficient selecting unit 137 acquires time information of a time when the frame detection notification signal has been received from the internal timing unit. The tap coefficient selecting unit 137 identifies identification information of one of the optical transmission devices 51-1 to 51-N that is the transmission source of the burst frame signal corresponding to the frame detection notification signal from the scheduling information based on the acquired time information and the scheduling information that has already been taken in.

When the identification information is identified, the tap coefficient selecting unit 137 reads the position information of the peak tap coefficient and the tap coefficients $W_1$ to $W_k$ from a record corresponding to the identification information by referring to the tap coefficient table 1351 of the storage unit 135b. The tap coefficient selecting unit 137 outputs the position information of the peak tap coefficient corresponding to the read identification information to the delay amount calculating unit 32 of the input timing adjusting unit 30 of the timing matching unit 133. The tap coefficient selecting unit 137 outputs the tap coefficients $W_1$ to $W_k$ corresponding to the read identification information to the adaptive equalization filter unit 134b in association with the identification information (step Sb2-2).

In steps Sb3-1, Sb3-2, and Sb4, the same processes as those of steps S3-1, S3-2, and S4 according to the first embodiment are performed by the input timing adjusting unit 30 of the timing matching unit 133. In the process of step Sb3-2, while the delay amount calculating unit 32 of the input timing adjusting unit 30 included in the timing matching unit 133 reads the position information of the peak tap coefficient from the storage unit 135 in the first embodiment, in the third embodiment, the delay amount calculating unit 32 takes in the position information of the peak tap coefficient output by the tap coefficient selecting unit 137 and calculates an amount of delay.

In addition, in a loop Lb1s to Lb1e that is an iterative process and steps Sb5, Sb6, and Sb7 within the loop, the same processes as those of the loop L1s to L1e and steps S5, S6, and S7 within the loop according to the first embodiment are performed by the adaptive equalization filter unit 134b. At the time of the process of step Sb6 for a first frame input signal, the tap coefficient configuring unit 44b outputs the tap coefficients $W_1$ to $W_k$ received from the tap coefficient selecting unit 137 to the multipliers 140-1 to 140-k and writes the identification information received from the tap coefficient selecting unit 137 in an internal storage area to be stored in an internal storage area.

In addition, when the loop Lb1s to Lb1e, which is an iterative process, ends, the tap coefficient configuring unit 44b detects the position of a maximum value among the tap coefficients $W_{M1}$ to $W_{Mk}$ received from the tap coefficient calculating unit 43, that is, the converged tap coefficients $W_{C1}$ to $W_{Ck}$. In addition, the timing at which the loop Lb1s to Lb1e illustrated in FIG. 22 ends is detected, for example, by the tap coefficient configuring unit 44b when the tap coefficients $W_{M1}$ to $W_{Mk}$ of new updated values are not output from the tap coefficient calculating unit 43 for a predetermined time set in advance, for example, a time longer than an operation time during which the tap coefficient calculating unit 43 performs calculation once.

The tap coefficient configuring unit 44b writes information representing the detected position of the maximum value of the tap coefficients $W_{C1}$ to $W_{Ck}$ in the item "position of a peak tap coefficient" in a record of the tap coefficient table 1351 of the storage unit 135b corresponding to the identification information stored in the internal storage area and updates the items "tap coefficient 1," "tap coefficient 2," . . . , and "tap coefficient k" by respectively writing the tap coefficients $W_{C1}$ to $W_{Ck}$ therein (step Sb8).

When any one of the other optical transmission devices 51-1 to 51-N transmits a burst optical signal, the light reception unit 11 of the optical reception device 10b receives the burst optical signal, and the ADC unit 12 outputs a digital signal, the signal processing unit 13b performs a process of a flowchart of FIG. 22 again.

By employing the configuration according to the third embodiment described above, the tap coefficient selecting unit 137 selects tap coefficients $W_1$ to $W_k$ corresponding to one of the optical transmission devices 51-1 to 51-N that transmits a next burst optical signal from among the tap coefficients $W_1$ to $W_k$ that are set in advance for each of the optical transmission devices 51-1 to 51-N based on scheduling information representing a timing at which each of the plurality of optical transmission devices 51-1 to 51-N transmits a burst optical signal and gives the selected tap coefficients to the taps 40-1 to 40-k of the adaptive equalization filter unit 134b. The input timing adjusting unit 30 takes in a sample signal of the burst frame signal and adjusts the timing at which the taken-in sample signal is output to the adaptive equalization filter unit 134b, and thus outputs the sample signal corresponding to the symbol timing to one of the taps 40-1 to 40-k to which a maximum value of the tap coefficients $W_1$ to $W_k$ is given among the tap coefficients $W_1$ to $W_k$ that the tap coefficient selecting unit 137 has given to the taps 40-1 to 40-k.

In other words, the optical reception device 10b according to the third embodiment stores the optimal tap coefficients $W_1$ to $W_k$ that have been calculated in advance in accordance with the characteristics of the optical transmission devices 51-1 to 51-N that are transmission sources of burst frame signals in the tap coefficient table 1351 of the storage unit 135b in advance. The tap coefficient selecting unit 137 identifies a transmission source of the burst frame signal that is a processing target of the next adaptive equalization filtering process based on the frame detection notification signal and the scheduling information, and selects the tap coefficients $W_1$ to $W_k$ corresponding to the identified transmission source from the tap coefficient table 1351. The adaptive equalization filter unit 134b performs an adaptive equalization filtering process using tap coefficients $W_1$ to $W_k$ selected by the tap coefficient selecting unit 137.

As described above, it is known that a convergence time of the tap coefficients $W_1$ to $W_k$ becomes shorter as the tap coefficients $W_1$ to $W_k$ at a time when a burst frame signal is given and the tap coefficients $W_1$ to $W_k$ after convergence using the burst frame signal have closer values and becomes longer as the tap coefficients have values that are further apart. In the optical reception device 10b according to the third embodiment, the initial values of the tap coefficients $W_1$ to $W_k$ have already been the tap coefficients $W_1$ to $W_k$ that are optimal to a burst frame signal, and thus a deviation from the tap coefficients $W_1$ to $W_k$ after convergence is small, and the convergence time becomes a short time.

In addition, similar to the optical reception device 10 according to the first embodiment, in the optical reception device 10b according to the third embodiment, the input timing adjusting unit 30 of the timing matching unit 133 causes a sample signal corresponding to a symbol timing and one of the taps 40-1 to 40-i to which a peak of the tap coefficients $W_1$ to $W_k$ is given to coincide with each other, and thus the number of iterations of feedback calculation is reduced, and a convergence time of the tap coefficients $W_1$ to $W_k$ is shortened. For this reason, the optical reception device 10b according to the third embodiment combines two techniques for shortening the convergence time, and thus a convergence time of the tap coefficients $W_1$ to $W_k$ can be significantly shortened.

Another Configuration Example of Third Embodiment

Figure 23:
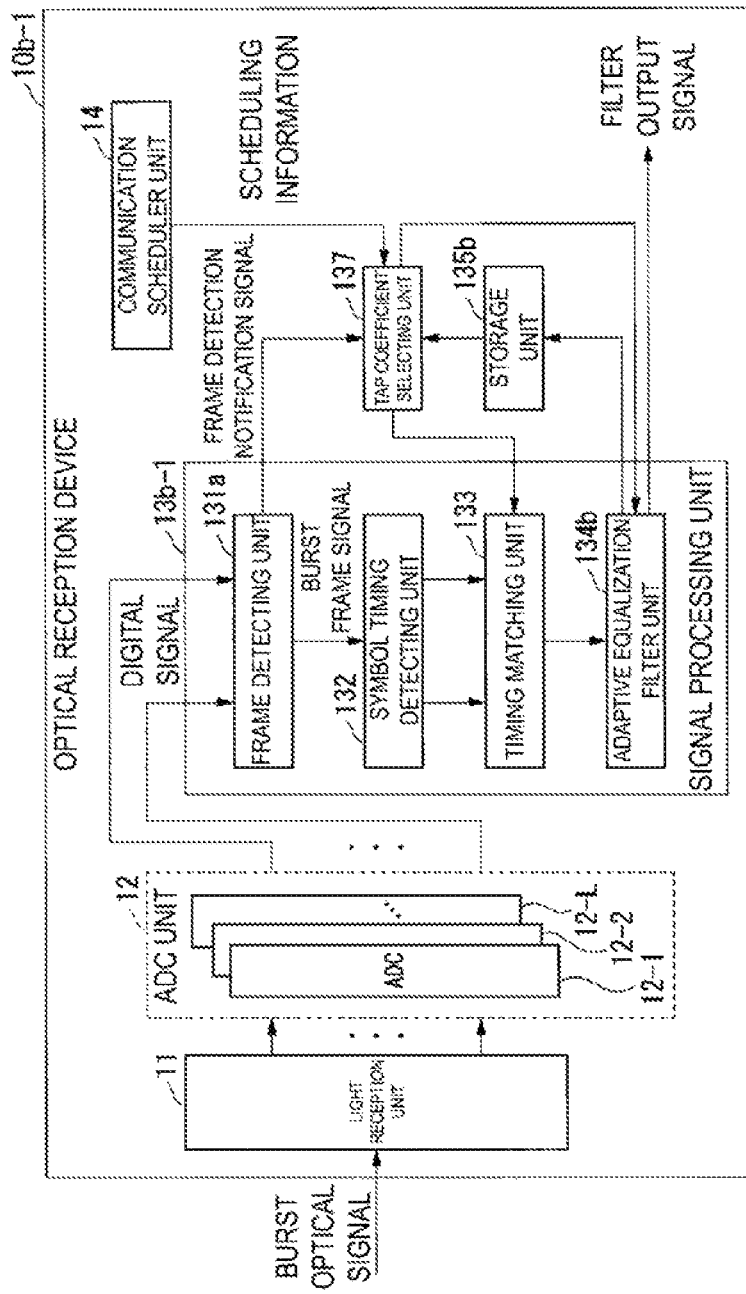
FIG. 23 is a block diagram illustrating another configuration example of the optical reception device according to the third embodiment.

FIG. 23 is a block diagram illustrating the configuration of an optical reception device 10b-1 that is another configuration example of the optical reception device 10b according to the third embodiment. While the signal processing unit 13b includes the tap coefficient selecting unit 137 and the storage unit 135b in the optical reception device 10b according to the third embodiment, the signal processing unit 13b-1 is configured not to include the tap coefficient selecting unit 137 and the storage unit 135b in the optical reception device 10b-1. For example, in a case that the communication scheduler unit 14 is included in an L2 processing unit of the optical reception device 10b-1, the L2 processing unit may be configured to include the tap coefficient selecting unit 137 and the storage unit 135b. In addition, the storage unit 135b may be included inside the signal processing unit 13b, and only the tap coefficient selecting unit 137 may be provided outside the signal processing unit 13b.

Also, in the optical reception device 10a according to the second embodiment, similarly, the storage unit 135a and the tap coefficient initializing unit 136 may be provided outside the signal processing unit 13a, or only the tap coefficient initializing unit 136 may be provided outside the signal processing unit 13a.

Fourth Embodiment

Figure 24:
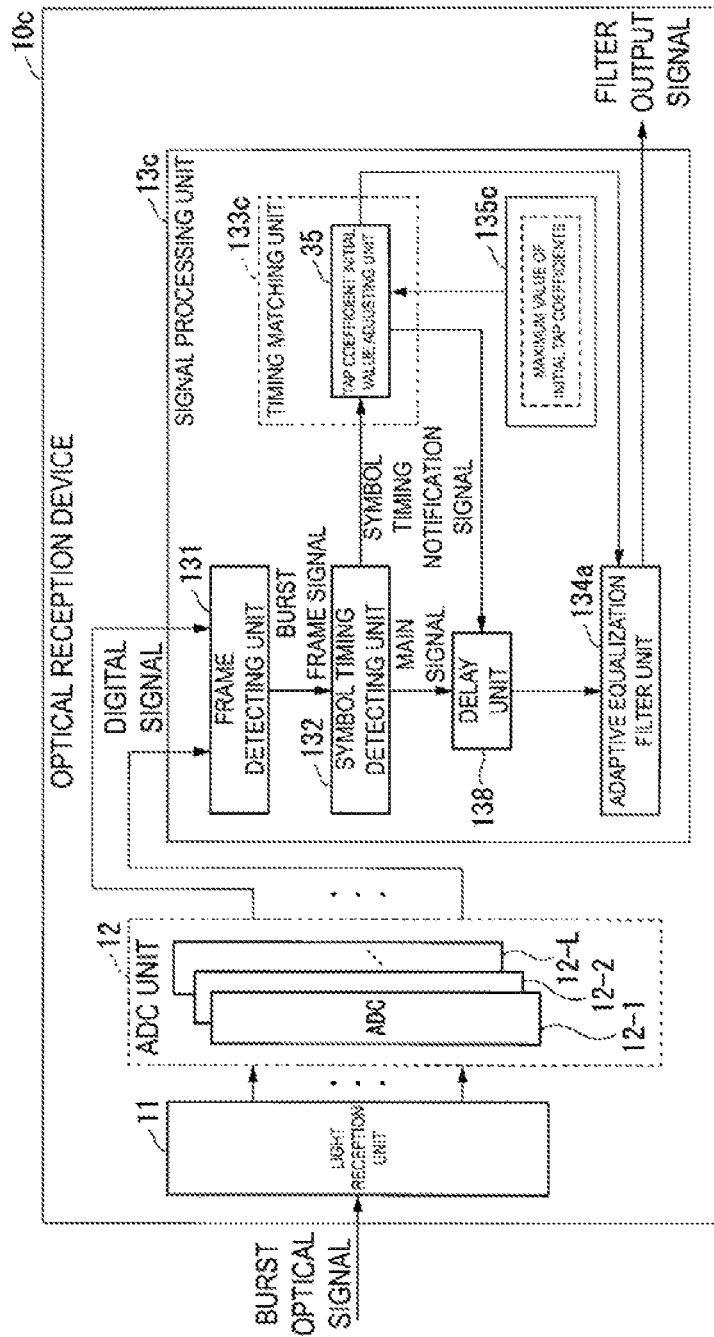
FIG. 24 is a block diagram illustrating the configuration of an optical reception device of a station-side communication apparatus according to a fourth embodiment.

FIG. 24 is a block diagram illustrating an internal configuration of an optical reception device 10c according to a fourth embodiment. Although not illustrated, for convenience of description, a communication system 1c according to the fourth embodiment includes a station-side communication apparatus 5c that includes the optical reception device 10c according to the fourth embodiment, and subscriber-side communication apparatuses 50-1 to 50-N and an optical coupler 60 that have the same configurations as those according to the first embodiment. In the optical reception device 10c according to the fourth embodiment, the same reference signs will be assigned to the same components as those of the optical reception devices 10, 10a, and 10b according to the first, second, and third embodiments, and hereinafter, different components will be described.

The optical reception device 10c includes a light reception unit 11, an ADC unit 12, and a signal processing unit 13c. The signal processing unit 13c includes a frame detecting unit 131, a symbol timing detecting unit 132, a timing matching unit 133c, an adaptive equalization filter unit 134a, a storage unit 135c, and a delay unit 138.

The storage unit 135c stores a tap coefficient that is a maximum value of initial tap coefficients $W_{D1}$ to $W_{Dk}$ in advance. Hereinafter, the maximum value of the initial tap coefficients $W_{D1}$ to $W_{Dk}$ is denoted as a tap coefficient $W_{DMAX}$.

The timing matching unit 133c includes a tap coefficient initial value adjusting unit 35. Similar to the timing matching unit 133 according to the first embodiment, the timing matching unit 133c according to the fourth embodiment matches the timing such that a sample signal corresponding to a symbol timing of a main signal output by the symbol timing detecting unit 132 is given to one of multipliers 140-1 to 140-k to which the peak tap coefficient $W_{DMAX}$ is given.

While the timing matching unit 133 according to the first embodiment matches the timing by adjusting a timing at which a main signal is output, the timing matching unit 133c according to the fourth embodiment matches the timing by adjusting an output destination of the tap coefficient $W_{DMAX}$ having a maximum value of the initial values.

When a symbol timing notification signal is received from the symbol timing detecting unit 132, the tap coefficient initial value adjusting unit 35 reads the tap coefficient $W_{DMAX}$ that is the peak of the initial values from the storage unit 135c. In addition, the tap coefficient initial value adjusting unit 35 generates a series of initial tap coefficients $W_{D1}$ to $W_{Dk}$ such that the read peak tap coefficient $W_{DMAX}$ of initial values is given to the tap 40-t to which a sample signal corresponding to the symbol timing included in the symbol timing notification signal is given.

For example, in a case that the peak tap coefficient $W_{DMAX}$ stored in the storage unit 135c is "1," the tap coefficient initial value adjusting unit 35 sets the position of the peak tap coefficient $W_{DMAX}$ and generates a series of the initial tap coefficients $W_{D1}$ to $W_{Dk}$ with initial values of the remaining positions set as "0." The tap coefficient initial value adjusting unit 35 outputs the generated initial tap coefficients $W_{D1}$ to $W_{Dk}$ to the adaptive equalization filter unit 134a and outputs an output instruction signal to the delay unit 138.

The delay unit 138 takes in a main signal corresponding to a burst frame signal output by the symbol timing detecting unit 132 and stands by, and when an output instruction signal is received from the tap coefficient initial value adjusting unit 35, outputs the taken-in main signal to the adaptive equalization filter unit 134a.

Figure 25:
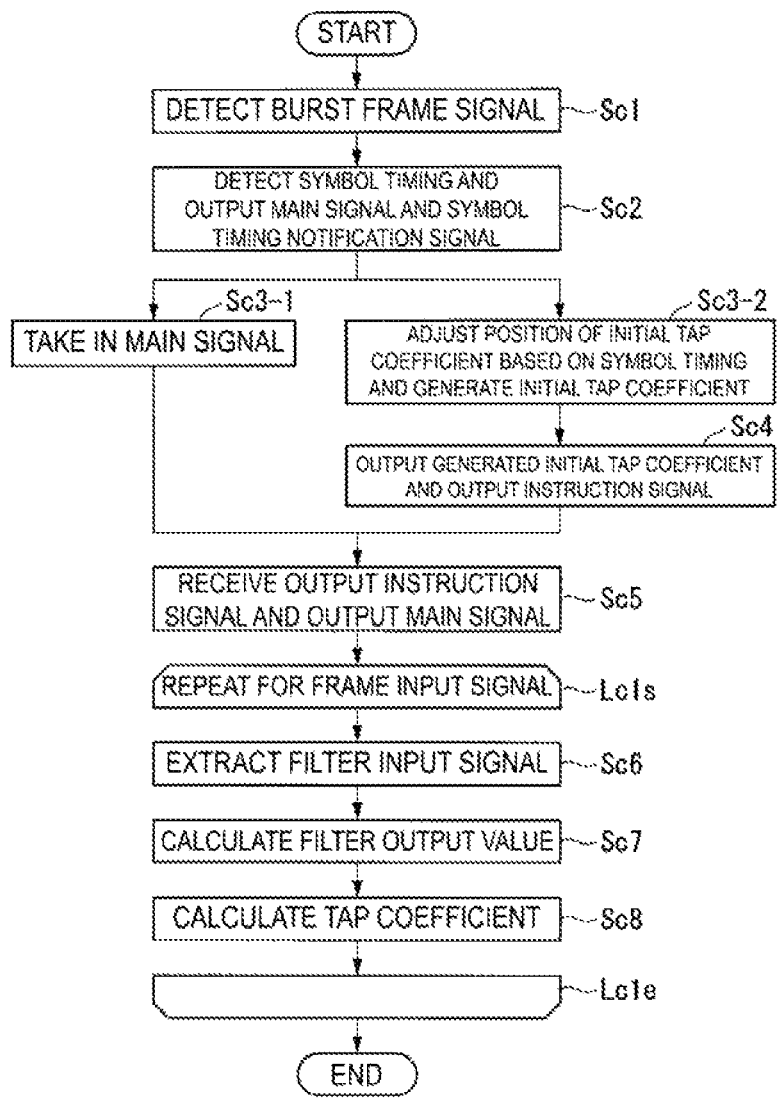
FIG. 25 is a flowchart illustrating a process performed by a signal processing unit according to the fourth embodiment.

Process performed by signal processing unit according to fourth embodiment Next, a process performed by the signal processing unit 13c according to the fourth embodiment will be described with reference to a flowchart illustrated in FIG. 25. The frame detecting unit 131 of the signal processing unit 13c detects a burst frame signal from a digital signal output by the ADC unit 12 and outputs the detected burst frame signal to the symbol timing detecting unit 132 (step Sc1).

When the symbol timing is detected, the symbol timing detecting unit 132 generates a symbol timing notification signal including information that represents the detected symbol timing. The symbol timing detecting unit 132 outputs the generated symbol timing notification signal to the tap coefficient initial value adjusting unit 35. The symbol timing detecting unit 132 sets the taken-in burst frame signal as a main signal and outputs the main signal to the delay unit 138 (step Sc2).

The delay unit 138 takes in the main signal and waits for reception of an output instruction signal from the tap coefficient initial value adjusting unit 35 (step Sc3-1). When the symbol timing notification signal is received from the symbol timing detecting unit 132, the tap coefficient initial value adjusting unit 35 reads the tap coefficient $W_{DMAX}$ that is the peak of initial values from the storage unit 135c. The tap coefficient initial value adjusting unit 35 generates a series of the initial tap coefficients $W_{D1}$ to $W_{Dk}$ such that the read peak tap coefficient $W_{DMAX}$ of the initial values is given to the tap 40-t to which a sample signal corresponding to the symbol timing included in the symbol timing notification signal is given (step Sc3-2).

The tap coefficient initial value adjusting unit 35 outputs the generated initial tap coefficients $W_{D1}$ to $W_{Dk}$ to the adaptive equalization filter unit 134a and outputs an output instruction signal to the delay unit 138 (step Sc4). When the output instruction signal is received from the tap coefficient initial value adjusting unit 35, the delay unit 138 outputs the taken-in main signal to the adaptive equalization filter unit 134a (step Sc5).

In a loop Lc1s to Lc1e that is an iterative process and steps Sc6, Sc7, and Sc8 within the loop, the same processes as those of the loop L1s to L1e and steps S5, S6, and S7 within the loop according to the first embodiment are performed by the adaptive equalization filter unit 134a. At the time of the process of step Sc7 for a first frame input signal, the tap coefficient configuring unit 44a outputs the initial tap coefficients $W_{D1}$ to $W_{Dk}$ received from the tap coefficient initial value adjusting unit 35 to the multipliers 140-1 to 140-k, respectively.

When any one of the other optical transmission devices 51-1 to 51-N transmits a burst optical signal, the light reception unit 11 of the optical reception device 10c receives the burst optical signal, and the ADC unit 12 outputs a digital signal, the signal processing unit 13c performs the process of the flowchart of FIG. 25 again.

In the configuration according to the fourth embodiment described above, the tap coefficient initial value adjusting unit 35 included in the timing matching unit 133c gives the tap coefficients $W_1$ to $W_k$ to the taps 40-1 to 40-k such that one of the tap coefficients $W_1$ to $W_k$ of the taps 40-1 to 40-k to which the sample signal corresponding to the symbol timing is given has a maximum value. In this way, the sample signal corresponding to the symbol timing and the peak tap coefficient can be given to the same taps 40-1 to 40-k. For this reason, in the calculation of optimal tap coefficients that is performed every time a burst optical signal is received, the optical reception device 10c can reduce the number of iterations of feedback calculation and can shorten the convergence time.

Although the storage unit 135c stores the tap coefficient $W_{DMAX}$, which is the maximum value of the initial values, in advance, and the tap coefficient initial value adjusting unit 35 reads the tap coefficient $W_{DMAX}$ from the storage unit 135c, sets the position of the tap coefficient $W_{DMAX}$, and generates a series of the initial tap coefficients $W_{D1}$ to $W_{Dk}$ in the fourth embodiment described above, the configuration of the present invention is not limited to that of the embodiment. For example, the storage unit 135c may not be provided, and the tap coefficient initial value adjusting unit 35 may generate a random number such that the position of the tap 40-t to which the sample signal corresponding to the symbol timing included in the symbol timing notification signal is given has a maximum value and set the generated random number as a series of the initial tap coefficients $W_{D1}$ to $W_{Dk}$.

In the first to fourth embodiments described above, the symbol timing detecting unit 132 is configured to use the modulation scheme in which the amplitude A of the sample signal corresponding to the symbol timing is greater than the amplitude A of the other sample signal, and, for example, the MAM that can be applied when BPSK, QPSK, and the like are applied is used, but the configuration of the present invention is not limited to the embodiments described above. For example, in a case that a modulation scheme in which a dispersion and a standard deviation of the amplitude A of sample signals corresponding to the symbol timing are larger than those of the other sample signals, for example, on-off-keying (OOK) or the like is applied to the optical transmission devices 51-1 to 51-N, a symbol timing detecting unit 132d illustrated in FIG. 26 may be applied.

Figure 26:
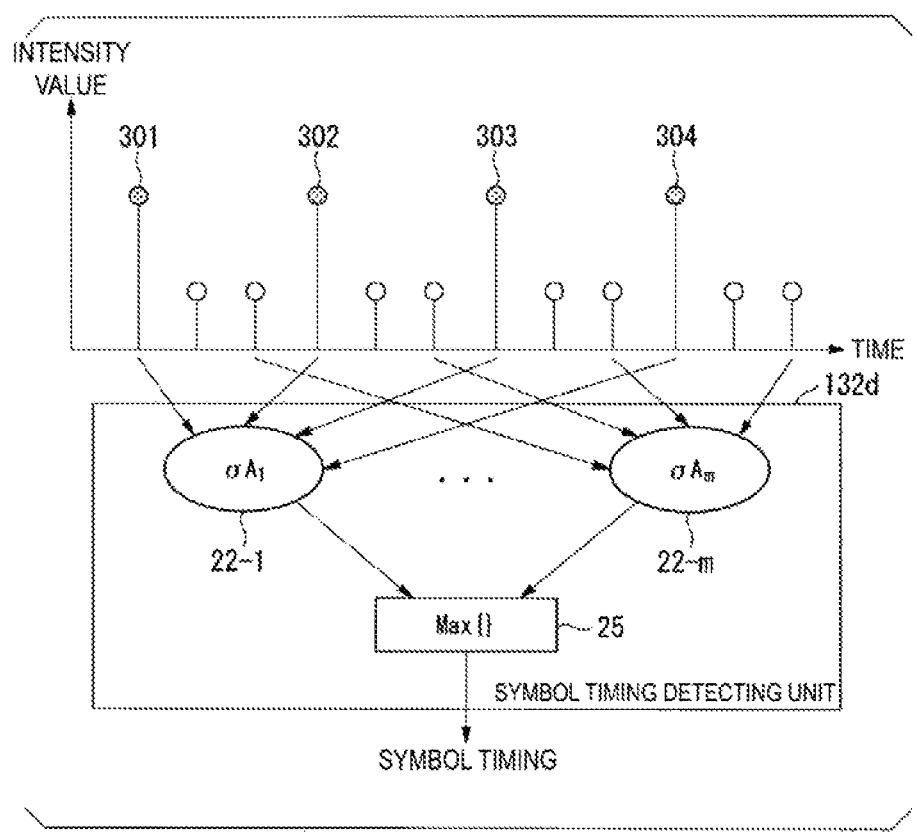
FIG. 26 is a diagram illustrating another example of a process performed by a symbol timing detecting unit.

The symbol timing detecting unit 132d illustrated in FIG. 26 calculates for every m samples a dispersion or a standard deviation of the amplitude A, or a value representing the same trend as that of the dispersion or the standard deviation and detects a sample signal having a maximum value among the calculated m values as a sample signal corresponding to the symbol timing.

Figure 27:
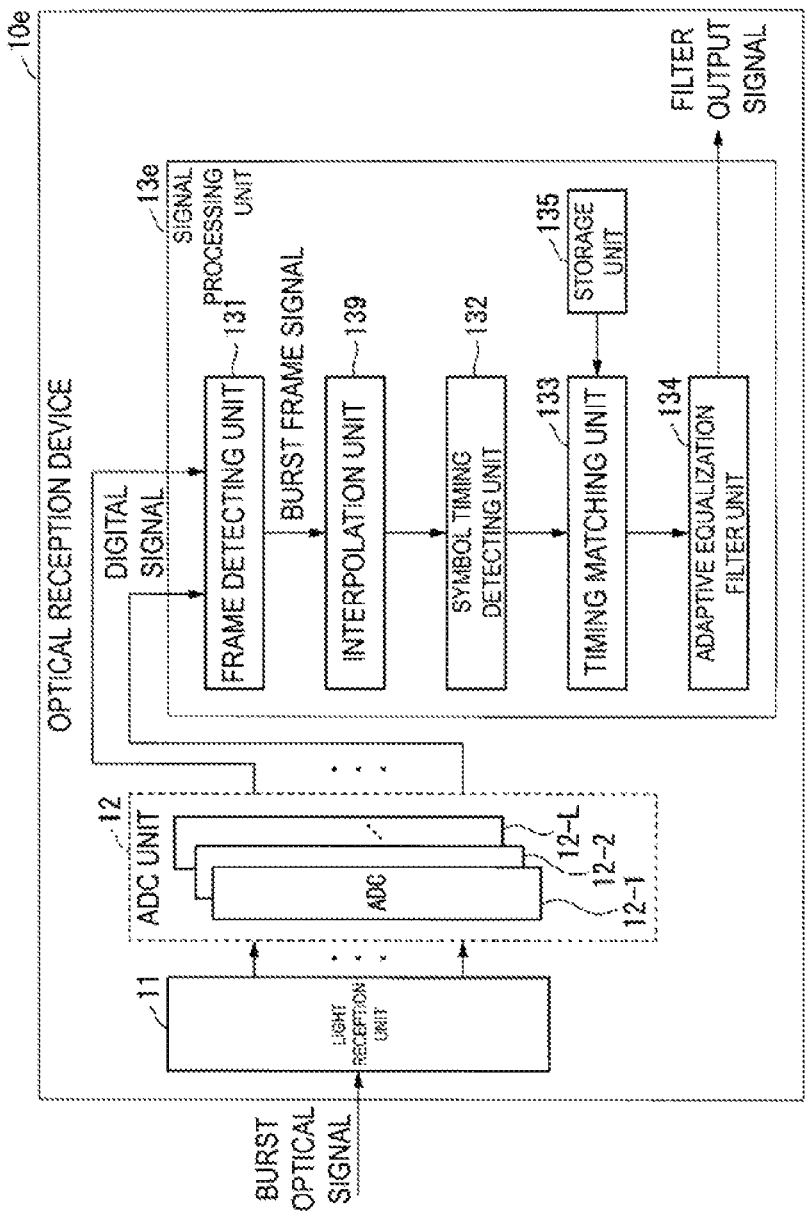
FIG. 27 is a block diagram illustrating another configuration example of an optical reception device according to the first embodiment.
Figure 28:
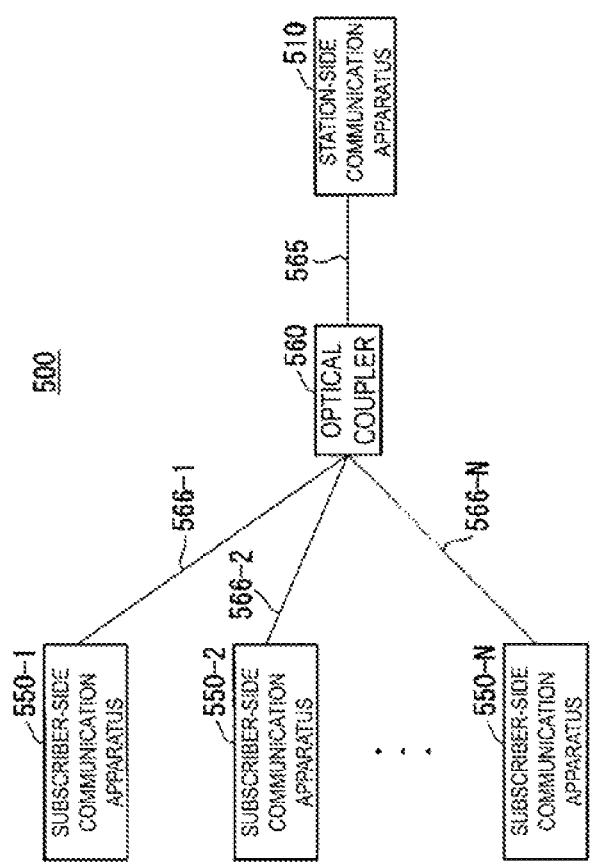
FIG. 28 is a block diagram illustrating the configuration of a communication system of a PON system.
Figure 29:
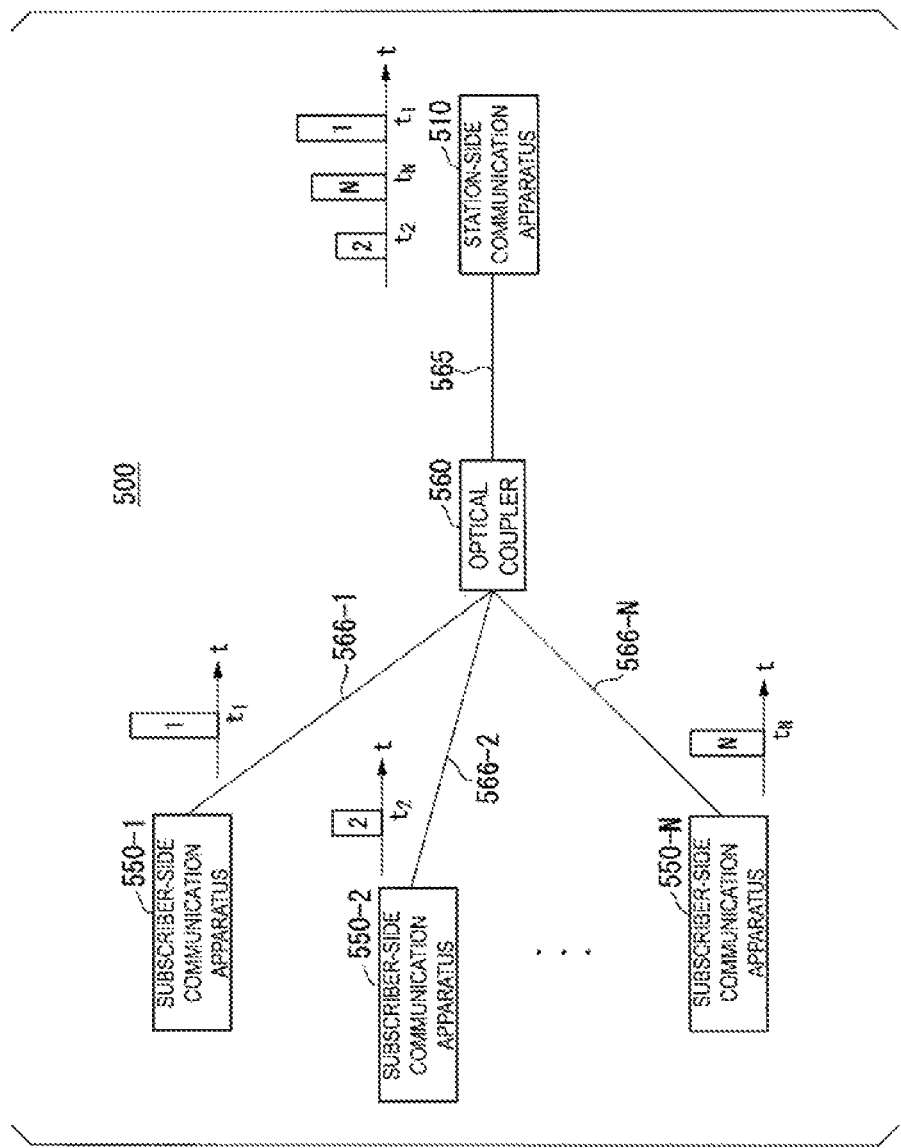
FIG. 29 is a diagram illustrating a DBA in a communication system of the PON system.

Although the ADC unit 12 performs oversampling in the optical reception devices 10 and 10-1 according to the first embodiment described above, the configuration of the present invention is not limited to that of the embodiment described above. The ADC unit 12 may be configured not to perform oversampling, and, for example, like the optical reception device 10e illustrated in FIG. 27, an interpolation unit 139 that performs an interpolation process may be included between the frame detecting unit 131 and the symbol timing detecting unit 132, and more sample points than the sampling rate of the ADC unit 12 may be configured to be generated. Similarly, the optical reception devices 10a, 10b, 10b-1, and 10c according to the second to fourth embodiments may also be configured to include the interpolation unit 139 between the frame detecting unit 131a/131 and the symbol timing detecting unit 132.

In addition, in the first to fourth embodiments described above, the signal processing unit 13/13-1/13a/13b/13b-1/13c may be configured not to be provided as functional units but to be provided as a single signal processing device and be used by being connected to the ADC unit 12.

The signal processing units 13, 13-1, 13a, 13b, 13b-1, and 13c according to the embodiments described above may be implemented using computers. In such a case, the signal processing units may be implemented by recording a program for implementing their functions in a computer-readable recording medium, and causing a computer system to read and execute the program recorded in the recording medium. Note that the "computer system" as used herein includes an OS and hardware such as a peripheral device. The "computer-readable recording medium" refers to a portable medium such as a flexible disk, a magneto-optical disk, a ROM, and a CD-ROM, and a storage apparatus such as a hard disk installed in a computer system. Further, the "computer-readable recording medium" may also include such a medium that stores programs dynamically for a short period of time, one example of which is a communication line used when a program is transmitted via a network such as the Internet and a communication line such as a telephone line, and may also include such a medium that stores programs for a certain period of time, one example of which is volatile memory inside a computer system that functions as a server or a client in the above-described case. Further, the above program may be a program for implementing a part of the above-mentioned functions. The above program may be a program capable of implementing the above-mentioned functions in combination with another program already recorded in a computer system. The above program may be a program to be implemented with the use of a programmable logic device such as a field programmable gate array (FPGA).

The embodiments of the present invention have been described above in detail with reference to the drawings. However, specific configurations are not limited to those embodiments, and include any design or the like within the scope not departing from the gist of the present invention.

REFERENCE SIGNS LIST

1 Communication system
5 Station-side communication device
10 Optical reception device
11 Light reception unit
12 ADC unit
13 Signal processing unit
131 Frame detecting unit
132 Symbol timing detecting unit
133 Timing matching unit
134 Adaptive equalization filter unit
135 Storage unit

The invention claimed is:
1. A signal processing device included in an optical reception device configured to receive a burst optical signal transmitted by one of a plurality of optical transmission devices, the signal processing device comprising:
a symbol timing detecting unit configured to detect a symbol timing based on sample signals obtained by oversampling the burst optical signal converted into an electric signal with a sampling rate higher than a symbol rate;
an adaptive equalization filter unit configured to perform an equalization process on the sample signals; and a timing matching unit configured to match timing such that, when the adaptive equalization filter unit takes in the sample signals, one of the taken-in sample signals corresponding to the symbol timing is given to a tap of which a tap coefficient has a maximum value among taps included in the adaptive equalization filter unit, wherein the timing matching unit includes an input timing adjusting unit configured to take in the sample signals and give the one of the taken-in sample signals corresponding to the symbol timing to the tap of which the tap coefficient has the maximum value by adjusting a timing at which the taken-in sample signals are output to the adaptive equalization filter unit, and wherein the input timing adjusting unit includes a delay amount calculating unit configured to calculate an amount of delay based on the symbol timing detected by the symbol timing detecting unit and a position of the tap of which the tap coefficient has the maximum value.

2. The signal processing device according to claim 1, wherein the input timing adjusting unit further includes a delay unit configured to take in the sample signals and output the taken-in sample signals to the adaptive equalization filter unit with delay in accordance with the amount of delay calculated by the delay amount calculating unit.

3. The signal processing device according to claim 1, wherein the input timing adjusting unit is configured to adjust a timing at which the taken-in sample signals is output to the adaptive equalization filter unit such that, in a case that the adaptive equalization filter unit obtains the tap coefficients that have converged, the one of the taken-in sample signals corresponding to the symbol timing is given to the tap to which a maximum value of the converged tap coefficients is given.

4. The signal processing device according to claim 1, further comprising:
 a frame detecting unit configured to detect, as a burst frame signal, a part corresponding to a frame of the burst optical signal from the sample signals; and
 a tap coefficient initializing unit configured to set, in a case that the frame detecting unit newly detects the burst frame signal, the tap coefficients of the taps in the adaptive equalization filter unit to initial values set in advance.

5. The signal processing device according to claim 1, further comprising a tap coefficient selecting unit configured to:
 select the tap coefficient corresponding to the one of the plurality of optical transmission devices that transmits the burst optical signal next among the tap coefficients set in advance for the plurality of optical transmission devices based on scheduling information representing a timing at which each of the plurality of optical transmission devices transmits the burst optical signal; and
 give the selected tap coefficient to the taps included in the adaptive equalization filter unit,
 wherein the input timing adjusting unit takes in the sample signals and adjusts a timing at which the taken-in sample signals is output to the adaptive equalization filter unit, and thus outputs the one of the taken-in sample signals corresponding to the symbol timing to the tap of which the tap coefficient has a maximum value among the tap coefficients given by the tap coefficient selecting unit to the taps.

6. The signal processing device according to claim 1, wherein the timing matching unit includes a tap coefficient initial value adjusting unit configured to give the tap coefficient to the taps included in the adaptive equalization filter unit such that the tap coefficient of the tap to which the one of the taken-in sample signals corresponding to the symbol timing is given reaches a maximum value.

7. An optical reception device comprising:
 a light reception unit configured to receive a burst optical signal transmitted by one of a plurality of optical transmission devices, convert the burst optical signal into an analog electric signal, and output the analog electric signal;
 an analog-to-digital conversion unit configured to convert the analog electric signal output by the light reception unit corresponding to the burst optical signal into a digital signal including sample signals obtained by oversampling with a sampling rate higher than a symbol rate; and
 a signal processing unit that is the signal processing device according to claim 1.

8. A signal processing method for an optical reception device configured to receive a burst optical signal transmitted by one of a plurality of optical transmission devices, the signal processing method comprising:
 detecting a symbol timing based on sample signals obtained by oversampling the burst optical signal converted into an electric signal with a sampling rate higher than a symbol rate;
 performing an equalization process on the sample signals;
 matching timing such that, when the sample signals are taken in, one of the taken-in sample signals corresponding to the symbol timing is given to a tap of which a tap coefficient has a maximum value among taps included;
 taking in the sample signals and giving the one of the taken-in sample signals corresponding to the symbol timing to the tap of which the tap coefficient has the maximum value by adjusting a timing at which the taken-in sample signals are output; and
 calculating an amount of delay based on the symbol timing detected and a position of the tap of which the tap coefficient has the maximum value.

9. The signal processing method according to claim 8, further comprising taking in the sample signals and outputting the taken-in sample signals with delay in accordance with the amount of delay calculated.

10. The signal processing method according to claim 8, wherein the input timing adjusting unit is configured to adjust a timing at which the taken-in sample signals is output to the adaptive equalization filter unit such that, in a case that the adaptive equalization filter unit obtains the tap coefficients that have converged, the one of the taken-in sample signals corresponding to the symbol timing is given to the tap to which a maximum value of the converged tap coefficients is given.

11. The signal processing method according to claim 8, further comprising:
 detecting, as a burst frame signal, a part corresponding to a frame of the burst optical signal from the sample signals; and
 setting, in a case that the burst frame signal is newly detected, the tap coefficients of the taps to initial values set in advance.

12. The signal processing method according to claim 8, further comprising:
 selecting the tap coefficient corresponding to the one of the plurality of optical transmission devices that transmits the burst optical signal next among the tap coefficients set in advance for the plurality of optical transmission devices based on scheduling information representing a timing at which each of the plurality of optical transmission devices transmits the burst optical signal; and giving the selected tap coefficient to the taps included, taking in the sample signals and adjusting a timing at which the taken-in sample signals is output, and thus outputting the one of the taken-in sample signals corresponding to the symbol timing to the tap of which the tap coefficient has a maximum value among the tap coefficients given to the taps.

13. The signal processing method according to claim 8, further comprising giving the tap coefficient to the taps such that the tap coefficient of the tap to which the one of the taken-in sample signals corresponding to the symbol timing is given reaches a maximum value.

14. The signal processing method according to claim 8, further comprising:
   receiving a burst optical signal transmitted by one of a plurality of optical transmission devices, and converting the burst optical signal into an analog electric signal, and outputting the analog electric signal; and
   converting the analog electric signal output corresponding to the burst optical signal into a digital signal including sample signals obtained by oversampling with a sampling rate higher than a symbol rate.

* * * * *